United States Patent
Li et al.

(10) Patent No.: US 9,960,856 B2
(45) Date of Patent: May 1, 2018

(54) SYSTEM AND METHOD FOR OPTICAL RECEIVER

(71) Applicant: Huawei Technologies Co., Ltd., Shenzhen (CN)

(72) Inventors: Zhaohui Li, Guangzhou (CN); Xuebing Zhang, Guangzhou (CN); Huixiao Ma, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 0 days. days.

(21) Appl. No.: 15/338,150

(22) Filed: Oct. 28, 2016

(65) Prior Publication Data
US 2017/0048002 A1    Feb. 16, 2017

Related U.S. Application Data

(63) Continuation of application No. PCT/CN2014/076643, filed on Apr. 30, 2014.

(51) Int. Cl.
*H04B 10/00* (2013.01)
*H04B 10/079* (2013.01)
*H04B 10/61* (2013.01)

(52) U.S. Cl.
CPC ......... *H04B 10/6162* (2013.01); *H04B 10/00* (2013.01); *H04B 10/07951* (2013.01); *H04B 10/614* (2013.01); *H04B 10/6151* (2013.01)

(58) Field of Classification Search
None
See application file for complete search history.

(56) References Cited

U.S. PATENT DOCUMENTS

| | | |
|---|---|---|
| 2006/0098986 A1 | 5/2006 | Jung et al. |
| 2010/0021163 A1 | 1/2010 | Shieh |
| 2012/0219294 A1 | 8/2012 | Huang et al. |
| 2013/0236172 A1* | 9/2013 | Suzuki ............... H04B 10/612 398/43 |
| 2013/0263172 A1 | 9/2013 | Suzuki |

FOREIGN PATENT DOCUMENTS

| | | |
|---|---|---|
| CA | 2754757 A1 | 3/2010 |
| CN | 101686096 A | 3/2010 |
| CN | 103257402 A | 8/2013 |
| CN | 103370891 A | 10/2013 |
| CN | 103414680 A | 11/2013 |

OTHER PUBLICATIONS

Sakib, M.N., et al., "A Monolithic Optical Front-end for Soft-decision LDPC Decoders", Department of Electrical and Computer Engineering, McGill University, Montreal, Quebec, Canada, 2012, 8 pages.

* cited by examiner

*Primary Examiner* — Darren E Wolf
(74) *Attorney, Agent, or Firm* — Slater Matsil, LLP

(57) ABSTRACT

A receiver is provided, including a signal acquiring unit, a signal diversity unit that is connected to the signal acquiring unit, a signal combination unit that is connected to the signal diversity unit, and a digital-signal acquiring unit that is connected to the signal combination unit. The receiver can receive a dual-polarization signal and can eliminate SSBI from the dual-polarization signal.

18 Claims, 7 Drawing Sheets

SYSTEM AND METHOD FOR OPTICAL RECEIVER

CROSS-REFERENCE TO RELATED APPLICATIONS

This application is a continuation of International Application No. PCT/CN2014/076643, filed on Apr. 30, 2014, the disclosure of which is hereby incorporated by reference in its entirety.

TECHNICAL FIELD

Embodiments relate to the communications field, and in particular, to a system and method for an optical receiver.

BACKGROUND

With continuous development of network application, people have increasing requirements for a communication capacity, and a transmission rate of an optical communications network increases exponentially. Both a low-cost direct-detection optical communications system and a relatively-high-cost coherent-detection communications system that is based on a coherent receiver require implementation of larger-capacity transmission with lower costs.

In an existing direct-detection optical communications system, cost-effectiveness of the system is more emphasized, to implement a transmission capacity as large as possible with costs as low as possible. An optical signal in the direct-detection optical communications system has beat interference between different frequency components of the signal itself, also called signal-to-signal beat interference (SSBI), which compromises transmission performance of the direct-detection optical communications system.

To eliminate the SSBI and implement a larger transmission capacity, in a direct-detection optical communications system that is implemented using a digital signal processing (DSP) technology, a receiver sends a received optical signal to a DSP processing unit, and the DSP processing unit calculates SSBI in the optical signal by using a particular algorithm, and subtracts the SSBI from the optical signal according to a calculation result, so as to obtain an optical signal without the SSBI.

However, the foregoing method for receiving an optical signal and eliminating SSBI by using a DSP technology is not for a dual-polarization system and cannot implement receiving of a dual-polarization signal and elimination of SSBI from the dual-polarization signal.

SUMMARY

Embodiments provide a receiver, which can implement receiving of a dual-polarization signal and can eliminate SSBI from the dual-polarization signal.

According to a first aspect, a receiver is provided, including a signal acquiring unit, configured to receive a dual-polarization signal and a local oscillation, and separately perform polarization beam splitting processing on the dual-polarization signal and the local oscillation, to obtain signals of the dual-polarization signal in both X and Y polarization directions and signals of the local oscillation in both X and Y polarization directions. The receiver also includes a signal diversity unit, connected to the signal acquiring unit and configured to perform coupling processing on the signal of the dual-polarization signal in the X polarization direction and the signal of the local oscillation in the X polarization direction, to obtain coupled signals with different phase shifts in the X polarization direction; and further configured to perform coupling processing on the signal of the dual-polarization signal in the Y polarization direction and the signal of the local oscillation in the Y polarization direction, to obtain coupled signals with different phase shifts in the Y polarization direction. Additionally, the receiver includes a signal combination unit, connected to the signal diversity unit and configured to perform signal combination on a group of one coupled signal in the X polarization direction and one coupled signal in the Y polarization direction, to obtain a combined signal; and convert the combined signal to an electrical signal. The receiver also includes a digital-signal acquiring unit, connected to the signal combination unit and configured to receive the electrical signal output by the signal combination unit, and generate a digital signal of an electrical signal of the dual-polarization signal in the X polarization direction and a digital signal of an electrical signal of the dual-polarization signal in the Y polarization direction according to the received electrical signal.

With reference to the first aspect, in a first possible implementation manner of the first aspect, the signal acquiring unit includes a first polarization beam splitter (PBS), where an input end receives the dual-polarization signal, a first output end of the first PBS outputs the signal of the dual-polarization signal in the X polarization direction, and a second output end of the first PBS outputs the signal of the dual-polarization signal in the Y polarization direction; and a second PBS, where an input end receives the local oscillation, a first output end of the second PBS outputs the signal of the local oscillation in the X polarization direction, and a second output end of the second PBS outputs the signal of the local oscillation in the Y polarization direction.

With reference to the first possible implementation manner of the first aspect, in a second possible implementation manner of the first aspect, the signal diversity unit includes: a first polarization maintaining optical coupler (PMOC), where a first input end is connected to the first output end of the first PBS and receives the signal of the dual-polarization signal in the X polarization direction, a second input end is connected to the first output end of the second PBS and receives the signal of the local oscillation in the X polarization direction, a first output end is connected to an input end of a second PMOC and outputs a first signal to the second PMOC, where the first signal is:

$$\frac{1}{\sqrt{2}} j\vec{E}_{Sx} + \frac{1}{\sqrt{2}} \vec{E}_{LOx}$$

and a second output end is connected to an input end of a first attenuator and outputs a second signal to the first attenuator, where the second signal is:

$$\frac{1}{\sqrt{2}} \vec{E}_{Sx} + \frac{1}{\sqrt{2}} j\vec{E}_{LOx};$$

a first output end of the second PMOC outputs a first coupled signal, where the first coupled signal is:

$$\frac{1}{2} j\vec{E}_{Sx} + \frac{1}{2} \vec{E}_{LOx},$$

and a second output end outputs a second coupled signal, where the second coupled signal is:

$$-\frac{1}{2}\vec{E}_{Sx} + \frac{1}{2}j\vec{E}_{LOx};$$

and an output end of the first attenuator outputs a third coupled signal, where the third coupled signal is:

$$\frac{1}{2}\vec{E}_{Sx} + \frac{1}{2}j\vec{E}_{LOx};$$

and a third PMOC, where a first input end is connected to the second output end of the first PBS and receives the signal of the dual-polarization signal in the Y polarization direction, a second input end is connected to the second output end of the second PBS and receives the signal of the local oscillation in the Y polarization direction, a first output end is connected to an input end of a second attenuator and outputs a third signal to the second attenuator, where the third signal is:

$$\frac{1}{\sqrt{2}}j\vec{E}_{Sy} + \frac{1}{\sqrt{2}}\vec{E}_{LOy},$$

and a second output end is connected to an input end of a fourth PMOC and outputs a fourth signal to the fourth PMOC, where the fourth signal is:

$$\frac{1}{\sqrt{2}}\vec{E}_{Sy} + \frac{1}{\sqrt{2}}j\vec{E}_{LOy};$$

an output end of the second attenuator outputs a fourth coupled signal, where the fourth coupled signal is:

$$\frac{1}{2}j\vec{E}_{Sy} + \frac{1}{2}\vec{E}_{LOy};$$

a first output end of the fourth PMOC outputs a fifth coupled signal, where the fifth coupled signal is:

$$\frac{1}{2}\vec{E}_{Sy} + \frac{1}{2}j\vec{E}_{LOy},$$

and a second output end outputs a sixth coupled signal, where the sixth coupled signal is:

$$\frac{1}{2}j\vec{E}_{Sy} - \frac{1}{2}\vec{E}_{LOy};$$

where $\vec{E}_{Sx}$ is the signal of the dual-polarization signal in the X polarization direction, $\vec{E}_{Sy}$ is the signal of the dual-polarization signal in the Y polarization direction, $\vec{E}_{LOx}$ is the signal of the local oscillation in the X polarization direction, and $\vec{E}_{LOy}$ is the signal of the local oscillation in the Y polarization direction.

With reference to the second possible implementation manner of the first aspect, in a third possible implementation manner of the first aspect, the signal combination unit includes: a first polarization beam combiner PBC, where a first input end is connected to the first output end of the second PMOC and receives the first coupled signal, a second input end is connected to the output end of the second attenuator and receives the fourth coupled signal, and an output end is connected to an input end of a first photoelectric detector (PD) and outputs a first combined signal to the first PD, where the first combined signal is a sum of the first coupled signal and the fourth coupled signal; a second PBC, where a first input end is connected to the second output end of the second PMOC and receives the second coupled signal, a second input end is connected to the first output end of the fourth PMOC and receives the fifth coupled signal, and an output end is connected to an input end of a second PD and outputs a second combined signal to the second PD, where the second combined signal is a sum of the second coupled signal and the fifth coupled signal; a third PBC, where a first input end is connected to the output end of the first attenuator and receives the third coupled signal, a second input end is connected to the second output end of the fourth PMOC and receives the sixth coupled signal, and an output end is connected to an input end of a third PD and outputs a third combined signal to the third PD, where the third combined signal is a sum of the third coupled signal and the sixth coupled signal; the first PD, where an output end outputs an electrical signal of the first combined signal; the second PD, where an output end outputs an electrical signal of the second combined signal; and the third PD, where an output end outputs an electrical signal of the third combined signal.

With reference to the third possible implementation manner of the first aspect, in a fourth possible implementation manner of the first aspect, the digital-signal acquiring unit includes: a first converter, configured to convert the received electrical signals of the combined signals to digital signals of the combined signals respectively; and a first processor, where the first processor is connected to an output end of the first converter and is configured to sequentially perform subtraction on two successive digital signals that are of the electrical signals of the first combined signal to the third combined signal and that are output by the first converter, to obtain the digital signal of the electrical signal of the dual-polarization signal in the X polarization direction and the digital signal of the electrical signal of the dual-polarization signal in the Y polarization direction.

With reference to the third possible implementation manner of the first aspect, in a fifth possible implementation manner of the first aspect, the signal combination unit is further configured to: subtract the electrical signal of the second combined signal from the electrical signal of the first combined signal, to obtain the electrical signal of the dual-polarization signal in the Y polarization direction; and subtract the electrical signal of the third combined signal from the electrical signal of the second combined signal, to obtain the electrical signal of the dual-polarization signal in the X polarization direction; and the digital-signal acquiring unit includes: a second converter, configured to convert the electrical signal of the dual-polarization signal in the X polarization direction and the electrical signal of the dual-polarization signal in the Y polarization direction to digital signals respectively.

With reference to the fifth possible implementation manner of the first aspect, in a sixth possible implementation manner of the first aspect, the signal combination unit further specifically includes: a first subtractor, where a positive input end is connected to the output end of the first PD and inputs the electrical signal of the first combined signal, a negative input end is connected to the output end of the second PD and inputs the electrical signal of the second combined signal, and an output end outputs the electrical signal of the dual-polarization signal in the Y polarization direction; and a second subtractor, where a positive input end is connected to the output end of the second PD and inputs the electrical signal of the second combined signal, a negative input end is connected to the output end of the third PD and inputs the electrical signal of the third combined signal, and an output end outputs the electrical signal of the dual-polarization signal in the X polarization direction.

With reference to the first possible implementation manner of the first aspect, in a seventh possible implementation manner of the first aspect, the signal diversity unit includes: a first optical mixer, where a first input end is connected to the first output end of the first PBS and receives the signal of the dual-polarization signal in the X polarization direction, a second input end is connected to the first output end of the second PBS and receives the signal of the local oscillation in the X polarization direction, a first output end is connected to an input end of a fifth PMOC and outputs a fifth signal to the fifth PMOC, where the fifth signal is:

$$\frac{1}{\sqrt{2}} j\vec{E}_{Sx} + \frac{1}{\sqrt{2}} \vec{E}_{LOx},$$

a second output end is connected to an input end of a third attenuator and outputs a sixth signal to the third attenuator, where the sixth signal is:

$$\frac{1}{\sqrt{2}} \vec{E}_{Sx} + \frac{1}{\sqrt{2}} j\vec{E}_{LOx},$$

a third output end is connected to an input end of a sixth PMOC and outputs a seventh signal to the sixth PMOC, where the seventh signal is:

$$-\frac{1}{\sqrt{2}} \vec{E}_{Sx} + \frac{1}{\sqrt{2}} j\vec{E}_{LOx},$$

and a fourth output end is connected to an input end of a fourth attenuator and outputs an eighth signal to the fourth attenuator, where the eighth signal is:

$$\frac{1}{\sqrt{2}} j\vec{E}_{Sx} - \frac{1}{\sqrt{2}} \vec{E}_{LOx};$$

a first output end of the fifth PMOC outputs a seventh coupled signal, where the seventh coupled signal is:

$$\frac{1}{2} j\vec{E}_{Sx} + \frac{1}{2} \vec{E}_{LOx},$$

and a second output end outputs an eighth coupled signal, where the eighth coupled signal is:

$$-\frac{1}{2} \vec{E}_{Sx} + \frac{1}{2} j\vec{E}_{LOx};$$

an output end of the third attenuator outputs a ninth coupled signal, where the ninth coupled signal is:

$$\frac{1}{2} \vec{E}_{Sx} + \frac{1}{2} j\vec{E}_{LOx};$$

a first output end of the sixth PMOC outputs a tenth coupled signal, where the tenth coupled signal is:

$$-\frac{1}{2} \vec{E}_{Sx} + \frac{1}{2} j\vec{E}_{LOx},$$

and a second output end outputs an eleventh coupled signal, where the eleventh coupled signal is $$-\frac{1}{2} j\vec{E}_{Sx} - \frac{1}{2} \vec{E}_{LOx};$$

and an output end of the fourth attenuator outputs a twelfth coupled signal, where the twelfth coupled signal is:

$$\frac{1}{2} j\vec{E}_{Sx} - \frac{1}{2} \vec{E}_{LOx};$$

and a second optical mixer, where a first input end is connected to the second output end of the first PBS and receives the signal of the dual-polarization signal in the Y polarization direction, a second input end is connected to the second output end of the second PBS and receives the signal of the local oscillation in the Y polarization direction, a first output end is connected to an input end of a fifth attenuator and outputs a ninth signal to the fifth attenuator, where the ninth signal is:

$$\frac{1}{\sqrt{2}} j\vec{E}_{Sy} + \frac{1}{\sqrt{2}} \vec{E}_{LOy},$$

a second output end is connected to an input end of a seventh PMOC and outputs a tenth signal to the seventh PMOC, where the tenth signal is:

$$\frac{1}{\sqrt{2}} \vec{E}_{Sy} + \frac{1}{\sqrt{2}} j\vec{E}_{LOy},$$

a third output end is connected to an input end of a sixth attenuator and outputs an eleventh signal to the sixth attenuator, where the eleventh signal is:

$$-\frac{1}{\sqrt{2}} \vec{E}_{Sy} + \frac{1}{\sqrt{2}} j\vec{E}_{LOy},$$

and a fourth output end is connected to an input end of an eighth PMOC and outputs a twelfth signal to the eighth PMOC, where the twelfth signal is:

$$\frac{1}{\sqrt{2}} j\vec{E}_{Sy} - \frac{1}{\sqrt{2}} \vec{E}_{LOy};$$

an output end of the fifth attenuator outputs a thirteenth coupled signal, where the thirteenth coupled signal is:

$$\frac{1}{2} j\vec{E}_{Sy} + \frac{1}{2} \vec{E}_{LOy};$$

a first output end of the seventh PMOC outputs a fourteenth coupled signal, where the fourteenth coupled signal is:

$$\frac{1}{2} \vec{E}_{Sy} + \frac{1}{2} j\vec{E}_{LOy},$$

and a second output end outputs a fifteenth coupled signal, where the fifteenth coupled signal is:

$$\frac{1}{2} j\vec{E}_{Sy} - \frac{1}{2} \vec{E}_{LOy};$$

an output end of the sixth attenuator outputs a sixteenth coupled signal, where the sixteenth coupled signal is:

$$-\frac{1}{2} \vec{E}_{Sy} + \frac{1}{2} j\vec{E}_{LOy};$$

and a first output end of the eighth PMOC outputs a seventeenth coupled signal, where the seventeenth coupled signal is:

$$\frac{1}{2} j\vec{E}_{Sy} - \frac{1}{2} \vec{E}_{LOy},$$

and a second output end outputs an eighteenth coupled signal, where the eighteenth coupled signal is:

$$-\frac{1}{2} \vec{E}_{Sy} - \frac{1}{2} j\vec{E}_{LOy};$$

where $\vec{E}_{Sx}$ is the signal of the dual-polarization signal in the X polarization direction, $\vec{E}_{Sy}$ is the signal of the dual-polarization signal in the Y polarization direction, $\vec{E}_{LOx}$ is the signal of the local oscillation in the X polarization direction, and $\vec{E}_{LOy}$ is the signal of the local oscillation in the Y polarization direction.

With reference to the seventh possible implementation manner of the first aspect, in an eighth possible implementation manner of the first aspect, the signal combination unit includes: a fourth PBC, where a first input end is connected to the first output end of the fifth PMOC and receives the seventh coupled signal, a second input end is connected to the output end of the fifth attenuator and receives the thirteenth coupled signal, and an output end is connected to an input end of a fourth PD and outputs a fourth combined signal to the fourth PD, where the fourth combined signal is a sum of the seventh coupled signal and the thirteenth coupled signal; a fifth PBC, where a first input end is connected to the second output end of the fifth PMOC and receives the eighth coupled signal, a second input end is connected to the first output end of the seventh PMOC and receives the fourteenth coupled signal, and an output end is connected to an input end of a fifth PD and outputs a fifth combined signal to the fifth PD, where the fifth combined signal is a sum of the eighth coupled signal and the fourteenth coupled signal; a sixth PBC, where a first input end is connected to the output end of the third attenuator and receives the ninth coupled signal, a second input end is connected to the second output end of the seventh PMOC and receives the fifteenth coupled signal, and an output end is connected to an input end of a sixth PD and outputs a sixth combined signal to the sixth PD, where the sixth combined signal is a sum of the ninth coupled signal and the fifteenth coupled signal; a seventh PBC, where a first input end is connected to the first output end of the sixth PMOC and receives the tenth coupled signal, a second input end is connected to the output end of the fourth attenuator and receives the sixteenth coupled signal, and an output end is connected to an input end of a seventh PD and outputs a seventh combined signal to the seventh PD, where the seventh combined signal is a sum of the tenth coupled signal and the sixteenth coupled signal; an eighth PBC, where a first input end is connected to the second output end of the sixth PMOC and receives the eleventh coupled signal, a second input end is connected to the first output end of the eighth PMOC and receives the seventeenth coupled signal, and an output end is connected to an input end of an eighth PD and outputs an eighth combined signal to the eighth PD, where the eighth combined signal is a sum of the eleventh coupled signal and the seventeenth coupled signal; a ninth PBC, where a first input end is connected to the output end of the fourth attenuator and receives the twelfth coupled signal, a second input end is connected to the second output end of the eighth PMOC and receives the eighteenth coupled signal, and an output end is connected to an input end of a ninth PD and outputs a ninth combined signal to the ninth PD, where the ninth combined signal is a sum of the twelfth coupled signal and the eighteenth coupled signal; the fourth PD, where an output end outputs an electrical signal of the fourth combined signal; the fifth PD, where an output end outputs an electrical signal of the fifth combined signal; the sixth PD, where an output end outputs an electrical signal of the sixth combined signal; the seventh PD, where an output end outputs an electrical signal of the seventh combined signal; the eighth PD, where an output end outputs an electrical signal of the eighth combined signal; and the ninth PD, where an output end outputs an electrical signal of the ninth combined signal.

With reference to the eighth possible implementation manner of the first aspect, in a ninth possible implementation manner of the first aspect, the digital-signal acquiring unit includes: a third converter, configured to convert received electrical signals of combined signals to digital signals respectively; and a second processor, where the second processor is connected to an output end of a third converter and is configured to: subtract a digital signal of the electrical signal of the fifth combined signal from a digital signal, output by the third converter, of the electrical signal of the fourth combined signal, to obtain a digital signal of a quadrature component electrical signal of the dual-polarization signal in the Y polarization direction; subtract a digital signal of the electrical signal of the sixth combined signal from the digital signal, output by the third converter, of the electrical signal of the fifth combined signal, to obtain a digital signal of a quadrature component electrical signal of the dual-polarization signal in the X polarization direction; subtract a digital signal of the electrical signal of the eighth combined signal from a digital signal, output by the third converter, of the electrical signal of the seventh combined signal, to obtain a digital signal of an in-phase component electrical signal of the dual-polarization signal in the Y polarization direction; and subtract a digital signal of the electrical signal of the ninth combined signal from the digital signal, output by the third converter, of the electrical signal of the eighth combined signal, to obtain a digital signal of an in-phase component electrical signal of the dual-polarization signal in the X polarization direction.

With reference to the eighth possible implementation manner of the first aspect, in a tenth possible implementation manner of the first aspect, the signal combination unit is further configured to: subtract the electrical signal of the fifth combined signal from the electrical signal of the fourth combined signal, to obtain a quadrature component electrical signal of the dual-polarization signal in the Y polarization direction; and subtract the electrical signal of the sixth combined signal from the electrical signal of the fifth combined signal, to obtain a quadrature component electrical signal of the dual-polarization signal in the X polarization direction; and subtract the electrical signal of the eighth combined signal from the electrical signal of the seventh combined signal, to obtain an in-phase component electrical signal of the dual-polarization signal in the Y polarization direction; and subtract the electrical signal of the ninth combined signal from the electrical signal of the eighth combined signal, to obtain an in-phase component electrical signal of the dual-polarization signal in the X polarization direction; and the digital-signal acquiring unit includes: a fourth converter, configured to convert the in-phase component electrical signal of the dual-polarization signal in the Y polarization direction, the in-phase component electrical signal of the dual-polarization signal in the X polarization direction, the quadrature component electrical signal of the dual-polarization signal in the Y polarization direction, and the quadrature component electrical signal of the dual-polarization signal in the X polarization direction to digital signals respectively.

With reference to the tenth possible implementation manner of the first aspect, in an eleventh possible implementation manner of the first aspect, the signal combination unit further specifically includes: a third subtractor, where a positive input end is connected to the output end of the fourth PD and inputs the electrical signal of the fourth combined signal, a negative input end is connected to the output end of the fifth PD and inputs the electrical signal of the fifth combined signal, and an output end outputs the quadrature component electrical signal of the dual-polarization signal in the Y polarization direction; a fourth subtractor, where a positive input end is connected to the output end of the fifth PD and inputs the electrical signal of the fifth combined signal, a negative input end is connected to the output end of the sixth PD and inputs the electrical signal of the sixth combined signal, and an output end outputs the quadrature component electrical signal of the dual-polarization signal in the X polarization direction; a fifth subtractor, where a positive input end is connected to the output end of the seventh PD and inputs the electrical signal of the seventh combined signal, a negative input end is connected to the output end of the eighth PD and inputs the electrical signal of the eighth combined signal, and an output end outputs the in-phase component electrical signal of the dual-polarization signal in the Y polarization direction; and a sixth subtractor, where a positive input end is connected to the output end of the eighth PD and inputs the electrical signal of the eighth combined signal, a negative input end is connected to the output end of the ninth PD and inputs the electrical signal of the ninth combined signal, and an output end outputs the in-phase component electrical signal of the dual-polarization signal in the X polarization direction.

With reference to the first aspect, and/or the first possible implementation manner of the first aspect, and/or the second possible implementation manner of the first aspect, and/or the third possible implementation manner of the first aspect, and/or the fourth possible implementation manner of the first aspect, and/or the fifth possible implementation manner of the first aspect, in a twelfth possible implementation manner of the first aspect, the receiver further includes: a third processor, configured to receive the digital signal of the electrical signal of the dual-polarization signal in the X polarization direction and the digital signal of the electrical signal of the dual-polarization signal in the Y polarization direction, and process the digital signal of the electrical signal in the X polarization direction and the digital signal of the electrical signal in the Y polarization direction according to the following matrix, to obtain a result of demodulation of the dual-polarization signal:

$$\hat{H} = \begin{bmatrix} \cos(a) & -\sin(a) \\ \sin(a) & \cos(a) \end{bmatrix}^{-1},$$

where a is an angular difference existing between signal polarization coordinates and PBS coordinates.

According to a second aspect, a receiver is provided, including a signal acquiring unit, configured to receive a dual-polarization signal and perform polarization beam splitting processing on the dual-polarization signal, to obtain signals of the dual-polarization signal in both X and Y polarization directions. The receiver also includes a signal conversion unit, connected to the signal acquiring unit and configured to convert the signals of the dual-polarization signal in both X and Y polarization directions to electrical signals respectively.

Additionally, the receiver includes a digital-signal conversion unit, connected to the signal conversion unit and configured to convert the electrical signals output by the signal conversion unit to digital signals respectively. In the dual-polarization signal, data in every three frames is a unit, and structures of the data in three frames successively include: $\vec{E}_{Sx}$ and $\vec{E}_{Sy}$, $\vec{E}_{Sx}$ and $-\vec{E}_{Sy}$, and $-\vec{E}_{Sx}$ and $-\vec{E}_{Sy}$, where $\vec{E}_{Sx}$ is the signal of the dual-polarization signal in the X polarization direction, and $\vec{E}_{Sy}$ is the signal of the dual-polarization signal in the Y polarization direction.

With reference to the second aspect, in a first possible implementation manner of the second aspect, the signal acquiring unit includes: an input end of the third PBS receives the dual-polarization signal, a first output end of the third PBS outputs the signal of the dual-polarization signal in the X polarization direction, and a second output end of the third PBS outputs the signal of the dual-polarization signal in the Y polarization direction.

With reference to the first possible implementation manner of the second aspect, in a second possible implementation manner of the second aspect, the signal conversion unit includes: a tenth photoelectric detector PD, where an input end is connected to the first output end of the third PBS and receives the signal of the dual-polarization signal in the X polarization direction, and an output end outputs the electrical signal of the signal of the dual-polarization signal in the X polarization direction; and an eleventh PD, where an input end is connected to the second output end of the third PBS and receives the signal of the dual-polarization signal in the Y polarization direction, and an output end outputs the electrical signal of the signal of the dual-polarization signal in the Y polarization direction.

With reference to the second possible implementation manner of the second aspect, in a third possible implementation manner of the second aspect, the digital-signal conversion unit includes: a tenth analog-to-digital converter ADC, where an input end is connected to the output end of the tenth PD, to convert the electrical signal of the signal of the dual-polarization signal in the X polarization direction to a digital signal; and an eleventh ADC, where an input end is connected to the output end of the eleventh PD, to convert the electrical signal of the signal of the dual-polarization signal in the Y polarization direction to a digital signal.

According to the technical solutions provided in the embodiments, a signal acquiring unit is configured to receive a dual-polarization signal and a local oscillation, and separately perform polarization beam splitting processing on the dual-polarization signal and the local oscillation, to obtain signals of the dual-polarization signal in both X and Y polarization directions and signals of the local oscillation in both X and Y polarization directions; a signal diversity unit, connected to the signal acquiring unit, is configured to perform coupling processing on the signal of the dual-polarization signal in the X polarization direction and the signal of the local oscillation in the X polarization direction, to obtain coupled signals with different phase shifts in the X polarization direction, and is further configured to perform coupling processing on the signal of the dual-polarization signal in the Y polarization direction and the signal of the local oscillation in the Y polarization direction, to obtain coupled signals with different phase shifts in the Y polarization direction; a signal combination unit, connected to the signal diversity unit, is configured to perform signal combination on a group of one coupled signal in the X polarization direction and one coupled signal in the Y polarization direction, to obtain a combined signal, and convert the combined signal to an electrical signal; and a digital-signal acquiring unit, connected to the signal combination unit 130, is configured to receive the electrical signal of the combined signal output by the signal combination unit, and generate a digital signal of an electrical signal of the dual-polarization signal in the X polarization direction and a digital signal of an electrical signal of the dual-polarization signal in the Y polarization direction according to the received electrical signal. In this way, receiving of the dual-polarization signal is implemented; in addition, SSBI is eliminated from the dual-polarization signal through processing performed by the signal acquiring unit, signal diversity unit, and the signal combination unit on the dual-polarization signal and the local oscillation.

BRIEF DESCRIPTION OF THE DRAWINGS

To describe the technical solutions in the embodiments more clearly, the following briefly describes the accompanying drawings required for describing the embodiments. Apparently, the accompanying drawings in the following description show merely some embodiments, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments with reference to the accompanying drawings in the embodiments. Apparently, the described embodiments are merely a part rather than all of the embodiments. All other embodiments obtained by a person of ordinary skill in the art based on the embodiments without creative efforts shall fall within the protection scope.

Figure 1:
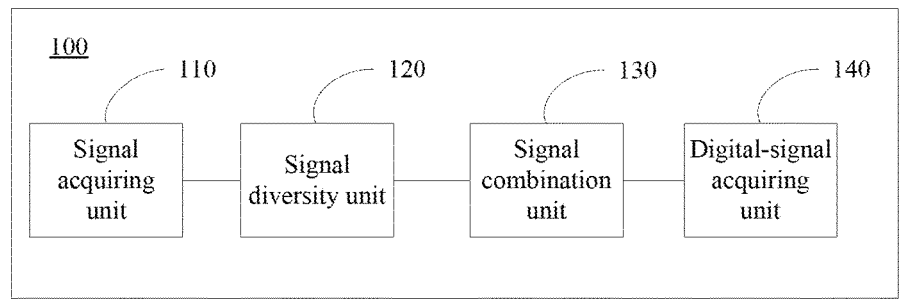
FIG. 1 is a schematic structural diagram of an implementation of a receiver according to an embodiment.

Refer to FIG. 1, which is a schematic structural diagram of a receiver according to an embodiment. The receiver 100 includes: a signal acquiring unit no, configured to receive a dual-polarization signal and a local oscillation, and separately perform polarization beam splitting processing on the dual-polarization signal and the local oscillation, to obtain signals of the dual-polarization signal in both X and Y polarization directions and signals of the local oscillation in both X and Y polarization directions; a signal diversity unit 120, connected to the signal acquiring unit 110 and configured to perform coupling processing on the signal of the dual-polarization signal in the X polarization direction and the signal of the local oscillation in the X polarization direction, to obtain coupled signals with different phase shifts in the X polarization direction; and further configured to perform coupling processing on the signal of the dual-polarization signal in the Y polarization direction and the signal of the local oscillation in the Y polarization direction, to obtain coupled signals with different phase shifts in the Y polarization direction; a signal combination unit 130, connected to the signal diversity unit 120 and configured to perform signal combination on a group of one coupled signal in the X polarization direction and one coupled signal in the Y polarization direction, to obtain a combined signal, and convert the combined signal to an electrical signal; and a digital-signal acquiring unit 140, connected to the signal combination unit 130 and configured to receive the electrical signal of the combined signal output by the signal combination unit 130, and generate a digital signal of an electrical signal of the dual-polarization signal in the X polarization direction and a digital signal of an electrical signal of the dual-polarization signal in the Y polarization direction according to the received electrical signal.

According to this embodiment, a signal acquiring unit is configured to receive a dual-polarization signal and a local oscillation, and separately perform polarization beam splitting processing on the dual-polarization signal and the local oscillation, to obtain signals of the dual-polarization signal in both X and Y polarization directions and signals of the local oscillation in both X and Y polarization directions; a signal diversity unit, connected to the signal acquiring unit, is configured to perform coupling processing on the signal of the dual-polarization signal in the X polarization direction and the signal of the local oscillation in the X polarization direction, to obtain coupled signals with different phase shifts in the X polarization direction, and is further configured to perform coupling processing on the signal of the dual-polarization signal in the Y polarization direction and the signal of the local oscillation in the Y polarization direction, to obtain coupled signals with different phase shifts in the Y polarization direction; a signal combination unit, connected to the signal diversity unit, is configured to perform signal combination on a group of one coupled signal in the X polarization direction and one coupled signal in the Y polarization direction, to obtain a combined signal, and convert the combined signal to an electrical signal; and a digital-signal acquiring unit, connected to the signal combination unit, is configured to receive the electrical signal of the combined signal output by the signal combination unit, and generate a digital signal of an electrical signal of the dual-polarization signal in the X polarization direction and a digital signal of an electrical signal of the dual-polarization signal in the Y polarization direction according to the received electrical signal. In this way, receiving of a dual-polarization signal is implemented, and SSBI is eliminated from the dual-polarization signal through processing performed on the dual signal and local oscillation by the signal acquiring unit, signal diversity unit, and signal combination unit. In addition, the receiver is implemented by using hardware, which is cost-effective, but offers a high processing speed and can meet real-time application requirements.

Figure 2:
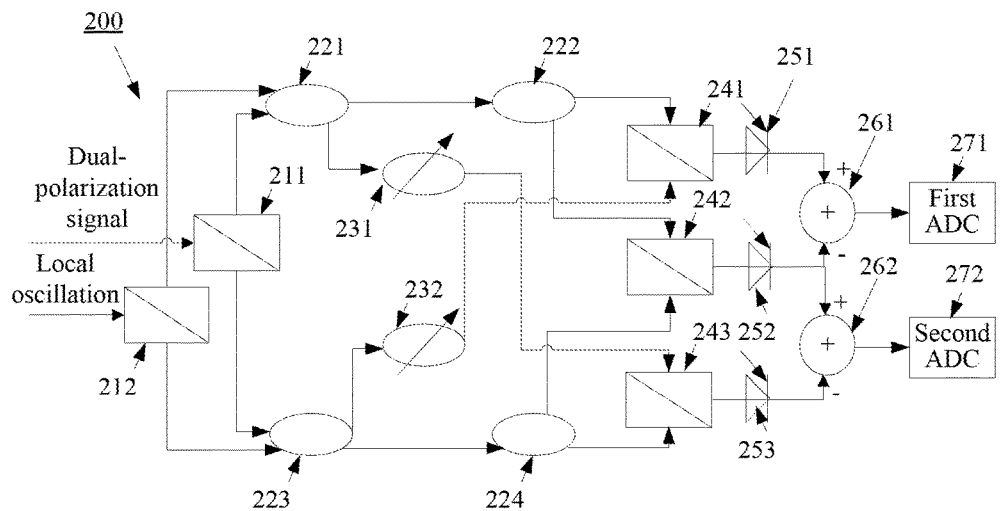
FIG. 2 is a schematic structural diagram of a second implementation of a receiver according to an embodiment.

Refer to FIG. 2, which is a schematic structural diagram of an implementation of a receiver according to an embodiment. In the receiver 200, a first polarization beam splitter (PBS) 211 and a second PBS 212 constitute a signal acquiring unit, a first polarization maintaining optical coupler (PMOC) 221 to a fourth PMOC 224, a first attenuator 231, and a second attenuator 232 constitute a signal diversity unit, a first polarization beam combiner (PBC) 241 to a third PBC 243, a first photoelectric detector (PD) 251 to a third PD 253, a first subtractor 261, and a second subtractor 262 constitute a signal combination unit, and a first analog-to-digital converter (ADC) 271 and a second ADC 272 constitute a digital-signal acquiring unit.

An input end of the first PBS 211 receives a dual-polarization signal, to perform polarization beam splitting processing on the dual-polarization signal. A first output end of the first PBS 211 is connected to a first input end of the first PMOC 221 and outputs a signal of the dual-polarization signal in an X polarization direction to the first PMOC 221. A second output end of the first PBS 211 is connected to a first input end of the third PMOC 223 and outputs a signal of the dual-polarization signal in a Y polarization direction to the third PMOC 223.

An input end of the second PBS 212 receives a local oscillation, to perform polarization beam splitting processing on the local oscillation. A first output end of the second PBS 212 is connected to a second input end of the first PMOC 221 and outputs a signal of the local oscillation in the X polarization direction to the first PMOC 221. A second output end of the second PBS 212 is connected to a second input end of the third PMOC 223 and outputs a signal of the local oscillation in the Y polarization direction to the third PMOC 223.

The first PMOC 221 is configured to perform coupling processing on the input signal of the dual-polarization signal in the X polarization direction and the input signal of the local oscillation in the X polarization direction. A first output end of the first PMOC 221 is connected to an input end of the second PMOC 222 and outputs a first signal to the second PMOC 222, where the first signal is:

$$\frac{1}{\sqrt{2}}j\vec{E}_{Sx} + \frac{1}{\sqrt{2}}\vec{E}_{LOx}.$$

A second output end of the first PMOC 221 is connected to an input end of the first attenuator 231 and outputs a second signal to the first attenuator 231, where the second signal is:

$$\frac{1}{\sqrt{2}}\vec{E}_{Sx} + \frac{1}{\sqrt{2}}j\vec{E}_{LOx}.$$

$\vec{E}_{Sx}$ is the signal of the dual-polarization signal in the X polarization direction, and $\vec{E}_{LOx}$ is the signal of the local oscillation in the X polarization direction.

The second PMOC 222 is configured to perform coupling processing on the input first signal. A first output end of the second PMOC 222 is connected to a first input end of the first PBC 241 and outputs a first coupled signal to the first PBC 241, where the first coupled signal $\vec{E}_1$ is:

$$\frac{1}{2}j\vec{E}_{Sx} + \frac{1}{2}\vec{E}_{LOx}.$$

A second output end is connected to a first input end of the second PBC 242 and outputs a second coupled signal to the second PBC 242, where the second coupled signal $\vec{E}_2$ is:

$$-\frac{1}{2}\vec{E}_{Sx} + \frac{1}{2}j\vec{E}_{LOx}.$$

The first attenuator 231 is configured to perform power attenuation processing on the input second signal. An output end of the first attenuator 231 is connected to a first input end of the third PBC 243 and outputs a third coupled signal to the third PBC 243, where the third coupled signal $\vec{E}_3$ is:

$$\frac{1}{2}\vec{E}_{Sx} + \frac{1}{2}j\vec{E}_{LOx}.$$

The third PMOC 223 is configured to perform coupling processing on the input signal of the dual-polarization signal in the Y polarization direction and the input signal of the local oscillation in the Y polarization direction. A first output end of the third PMOC 223 is connected to an input end of the second attenuator 232 and outputs a third signal to the second attenuator 232, where the third signal is:

$$\frac{1}{\sqrt{2}} j\vec{E}_{Sy} + \frac{1}{\sqrt{2}} \vec{E}_{LOy}.$$

A second output end of the third PMOC 223 is connected to an input end of the fourth PMOC 224 and outputs a fourth signal to the fourth PMOC 224, where the fourth signal is:

$$\frac{1}{\sqrt{2}} \vec{E}_{Sy} + \frac{1}{\sqrt{2}} j\vec{E}_{LOy}.$$

$\vec{E}_{Sx}$ is the signal of the dual-polarization signal in the Y polarization direction, and $\vec{E}_{LOx}$ is the signal of the local oscillation in the Y polarization direction.

The second attenuator 232 is configured to perform power attenuation processing on the input third signal. An output end of the second attenuator 232 is connected to a second input end of the first PBC 241 and outputs a fourth coupled signal to the first PBC 241, where the fourth coupled signal $\vec{E}_4$ is:

$$\frac{1}{2} j\vec{E}_{Sy} + \frac{1}{2} \vec{E}_{LOy}.$$

The fourth PMOC 224 is configured to perform coupling processing on the fourth signal. A first output end of the fourth PMOC 224 is connected to a second input end of the second PBC 242 and outputs a fifth coupled signal to the second PBC 242, where the fifth coupled signal $\vec{E}_5$ is:

$$\frac{1}{2} \vec{E}_{Sy} + \frac{1}{2} j\vec{E}_{LOy}.$$

A second output end of the fourth PMOC 224 is connected to a second input end of the third PBC 243 and outputs a sixth coupled signal to the third PBC 243, where the sixth coupled signal $\vec{E}_6$ is:

$$\frac{1}{2} j\vec{E}_{Sy} - \frac{1}{2} \vec{E}_{LOy}.$$

The first PBC 241 is configured to perform polarization beam combination processing on the first coupled signal and the fourth coupled signal. An output end of the first PBC 241 is connected to an input end of the first PD 251 and outputs a first combined signal to the first PD 251, where the first combined signal is a sum of the first coupled signal and the fourth coupled signal, and specifically, the first combined signal is:

$$\vec{E}_{o1} = \begin{bmatrix} \vec{E}_1 \\ \vec{E}_4 \end{bmatrix} = \frac{1}{2} \begin{bmatrix} j\vec{E}_{Sx} + \vec{E}_{LOx} \\ j\vec{E}_{Sy} + \vec{E}_{LOy} \end{bmatrix}.$$

The second PBC 242 is configured to perform polarization beam combination processing on the second coupled signal and the fifth coupled signal. An output end of the second PBC 242 is connected to an input end of the second PD 252 and outputs a second combined signal to the second PD 252, where the second combined signal is a sum of the second coupled signal and the fifth coupled signal, and specifically, the second combined signal is:

$$\vec{E}_{o2} = \begin{bmatrix} \vec{E}_2 \\ \vec{E}_5 \end{bmatrix} = \frac{1}{2} \begin{bmatrix} -\vec{E}_{Sx} + j\vec{E}_{LOx} \\ \vec{E}_{Sy} + j\vec{E}_{LOy} \end{bmatrix}.$$

The third PBC 243 is configured to perform polarization beam combination processing on the third coupled signal and the sixth coupled signal. An output end of the third PBC 243 is connected to an input end of the third PD 253 and outputs a third combined signal to the third PD 253, where the third combined signal is a sum of the third coupled signal and the sixth coupled signal, and specifically, the third combined signal is:

$$\vec{E}_{o3} = \begin{bmatrix} \vec{E}_3 \\ \vec{E}_6 \end{bmatrix} = \frac{1}{2} \begin{bmatrix} \vec{E}_{Sx} + j\vec{E}_{LOx} \\ j\vec{E}_{Sy} - \vec{E}_{LOy} \end{bmatrix}.$$

The first PD 251 is configured to convert the first combined signal to an electrical signal. An output end is connected to a positive input end of the first subtractor 261 and outputs the electrical signal of the first combined signal to the first subtractor 261, where specifically, the electrical signal of the first combined signal is:

$$I_1 \propto |j\vec{E}_{Sx} + \vec{E}_{LOx}|^2 + |j\vec{E}_{Sy} + \vec{E}_{LOy}|^2 = |\vec{E}_S|^2 + |\vec{E}_{LO}|^2 + 2RE\{[j\vec{E}_{Sx}\vec{E}^*_{LOx} + j\vec{E}_{Sy}\vec{E}^*_{LOy}]\},$$

and Re indicates acquiring a real part.

The second PD 252 is configured to convert the second combined signal to an electrical signal. An output end is connected to both a negative input end of the first subtractor 261 and a positive input end of the second subtractor 262, and outputs the electrical signal of the second combined signal to the first subtractor 261 and the second subtractor 262, where specifically, the electrical signal of the second combined signal is:

$$I_2 \propto |-\vec{E}_{Sx} + j\vec{E}_{LOx}|^2 + |\vec{E}_{Sy} + j\vec{E}_{LOy}|^2 = |\vec{E}_S|^2 + |\vec{E}_{LO}|^2 + 2RE\{[j\vec{E}_{Sx}\vec{E}^*_{LOx} - j\vec{E}_{Sy}\vec{E}^*_{LOy}]\},$$

The third PD 253 is configured to convert the third combined signal to an electrical signal. An output end is connected to a negative input end of the second subtractor 262 and outputs the electrical signal of the third combined signal to the second subtractor 262, where specifically, the electrical signal of the third combined signal is:

$$I_3 \propto |\vec{E}_{Sx} + j\vec{E}_{LOx}|^2 + |j\vec{E}_{Sy} - \vec{E}_{LOy}|^2 = |\vec{E}_S|^2 + |\vec{E}_{LO}|^2 + 2RE\{[-j\vec{E}_{Sx}\vec{E}^*_{LOx} - j\vec{E}_{Sy}\vec{E}^*_{LOy}]\},$$

The first subtractor 261 is configured to subtract the electrical signal of the second combined signal from the electrical signal of the first combined signal, to obtain an electrical signal of the dual-polarization signal in the Y polarization direction. An output end is connected to an input end of the first ADC 271 and outputs the electrical signal of the dual-polarization signal in the Y polarization direction to the first ADC 271, where specifically, the electrical signal of the dual-polarization signal in the Y polarization direction is:

$$I_y = I_1 - I_2 = -Im\{\vec{E}_{Sy}\vec{E}^*_{LOy}\},$$

and Im indicates acquiring an imaginary part.

The second subtractor 262 is configured to subtract the electrical signal of the third combined signal from the electrical signal of the second combined signal, to obtain an electrical signal of the dual-polarization signal in the X polarization direction. An output end is connected to an input end of the second ADC 272 and outputs the electrical signal of the dual-polarization signal in the X polarization direction to the second ADC 272, where specifically, the electrical signal of the dual-polarization signal in the X polarization direction is:

$$I_x = I_2 - I_3 = -Im\{\vec{E}_{sx}\vec{E}^*_{LOx}\},$$

The first ADC 271 is configured to convert the electrical signal of the dual-polarization signal in the Y polarization direction to a digital signal, to obtain a digital signal of the electrical signal of the dual-polarization signal in the Y polarization direction.

The second ADC 272 is configured to convert the electrical signal of the dual-polarization signal in the X polarization direction to a digital signal, to obtain a digital signal of the electrical signal of the dual-polarization signal in the X polarization direction.

Figure 2A:
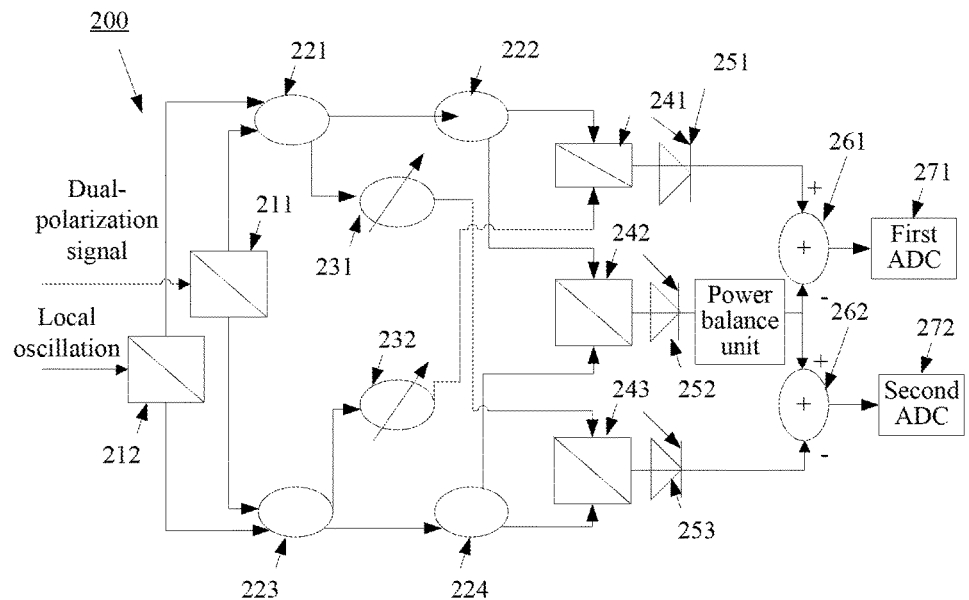
FIG. 2A is a schematic structural diagram of a third implementation of a receiver according to an embodiment.

In the receiver shown in FIG. 2, the second PD 252 needs to output the electrical signal of the second combined signal to both the first subtractor 261 and the second subtractor 262. Due to an electrical signal power loss caused by the device, in actual application, power of the electrical signal of the second combined signal output by the second PD 252 to the first subtractor 261 and the second subtractor 262 is usually less than the power of electrical signal of the first combined signal output by the first PD 251 to the first subtractor 261 and the power of electrical signal of the third combined signal output by the third PD 253 to the second subtractor 262. However, actually, powers of electrical signals input to two input ends of a subtractor are generally required to be the same. For this reason, in actual application, as shown in FIG. 2A, a power balance unit may be disposed between the output end of the second PD 252 and the input ends of the first subtractor 261 and the second subtractor 262, to increase the power of the electrical signal of the second combined signal output by the second PD 252, so that the two input ends of the first subtractor 261 and the two input ends of the second subtractor 262 receive signals of the same power. Specifically, the power balance unit may be implemented by using a power amplifier or the like.

Figure 3:
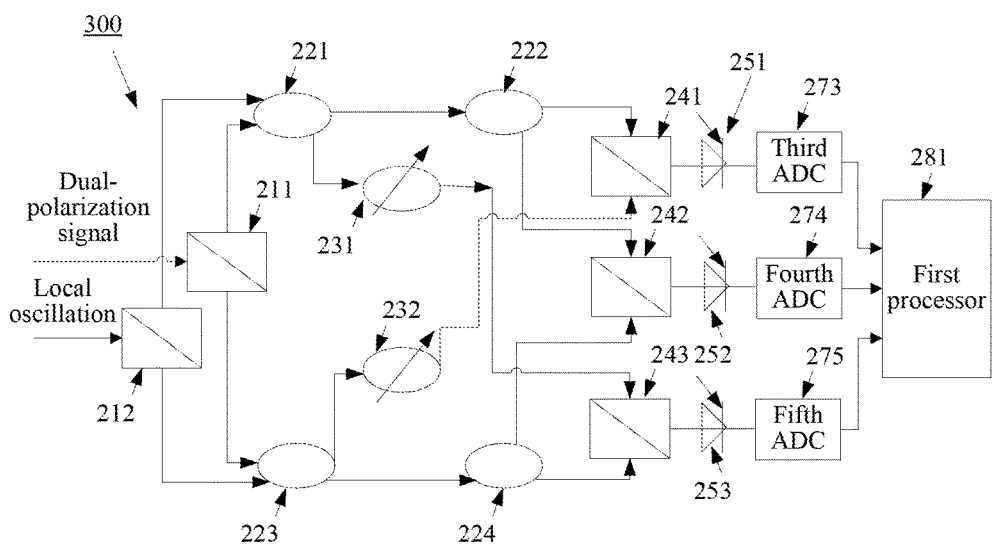
FIG. 3 is a schematic structural diagram of a fourth implementation of a receiver according to an embodiment.

Refer to FIG. 3, which is a schematic structural diagram of another implementation of a receiver according to an embodiment. Compared with a structure of the receiver shown in FIG. 2, in a structure of the receiver 300 shown in FIG. 3, a signal combination unit does not include a first subtractor 261 nor a second subtractor 262, and a digital-signal acquiring unit includes a first converter and a first processor 281, where the first converter is composed of a third ADC 273 to a fifth ADC 275.

In this embodiment, connection relationships and functions of the PBSs, PMOCs, attenuators, PBCs, and PDs are not repeatedly described, and reference may be made to related descriptions in FIG. 2. The following describes only the third ADC 273 to the fifth ADC 275 and the first processor 281 that are included in the digital-signal acquiring unit.

The first converter is configured to convert received electrical signals of combined signals to digital signals respectively. Specifically, an input end of the third ADC 273 is connected to an output end of a first PD 251 and receives an electrical signal of a first combined signal, the electrical signal of the first combined signal is converted to a digital signal, and the digital signal is output to the first processor 281 through an output end. An input end of the fourth ADC 274 is connected to an output end of a second PD 252 and receives an electrical signal of a second combined signal, the electrical signal of the second combined signal is converted to a digital signal, and the digital signal is output to the first processor 281 through an output end. An input end of the fifth ADC 275 is connected to an output end of a third PD 253 and receives an electrical signal of a third combined signal, the electrical signal of the third combined signal is converted to a digital signal, and the digital signal is output to the first processor 281 through an output end.

The first processor 281 is configured to sequentially perform subtraction on two successive digital signals of the electrical signals of the first combined signal to the third combined signal, to obtain a digital signal of an electrical signal of a dual-polarization signal in an X polarization direction and a digital signal of an electrical signal of the dual-polarization signal in a Y polarization direction.

The first processor 281 may be implemented by using a DSP.

Compared with the structure of the receiver shown in FIG. 2, the structure of the receiver shown in FIG. 3 reduces two subtractors, thereby reducing difficulty in implementing the receiver. In addition, subtraction processing on digital signals is implemented by using the first processor 281, which features easy implementation and extremely low algorithm complexity.

With respect to the structures of the receivers shown in FIG. 2 and FIG. 3, the structure of the receiver may further include: a third processor, where the third processor is connected to the digital-signal acquiring unit and is configured to receive the digital signal of the electrical signal of the dual-polarization signal in the X polarization direction and the digital signal of the electrical signal of the dual-polarization signal in the Y polarization direction that are output by the digital-signal acquiring unit, and process the digital signal of the electrical signal in the X polarization direction and the digital signal of the electrical signal in the Y polarization direction by using the following matrix, to obtain a result of demodulation of the dual-polarization signal:

$$\hat{H} = \begin{bmatrix} \cos(a) & -\sin(a) \\ \sin(a) & \cos(a) \end{bmatrix}^{-1},$$

where a is an angular difference existing between signal polarization coordinates and PBS coordinates.

With processing of the third processor, the receiver in this embodiment can implement demodulation of a dual-polarization signal, that is, when the dual-polarization signal enters a PBS in a co-polarization state at any angle, polarization demodulation of the signal can be implemented. An implementation principle is analyzed as follows:

Assuming that polarization aliasing does not exist in a signal, a system transmission matrix H of the receiver in this embodiment may be equivalent to a product of a constant and a unit matrix:

$$H = k \cdot \begin{bmatrix} 1 & 0 \\ 0 & 1 \end{bmatrix}.$$

Then, considering polarization aliasing mainly caused by the angular difference a existing between the signal polarization coordinates and the PBS coordinates, an expression of a system Jones matrix of the receiver is:

$$\begin{bmatrix} E_{x,out} \\ E_{y,out} \end{bmatrix} = H \begin{bmatrix} \cos(a) & -\sin(a) \\ \sin(a) & \cos(a) \end{bmatrix} \begin{bmatrix} E_{x,in} \\ E_{y,in} \end{bmatrix},$$

where $E_{x,out}$ is the digital signal of the electrical signal of the dual-polarization signal in the X polarization direction that is obtained by the digital-signal acquiring unit in the receiver, $E_{y,out}$ is the digital signal of the electrical signal of the dual-polarization signal in the Y polarization direction that is obtained by the digital-signal acquiring unit in the receiver, $E_{x,in}$ is a digital signal of an electrical signal, received by the receiver, of the dual-polarization signal in an X polarization direction, and $E_{x,in}$ is a digital signal of an electrical signal, received by the receiver, of the dual-polarization signal in a Y polarization direction.

Therefore, the Jones matrix of de-polarization is $\hat{H}$:

$$\hat{H} = \begin{bmatrix} \cos(a) & -\sin(a) \\ \sin(a) & \cos(a) \end{bmatrix}^{-1}.$$

Figure 4:
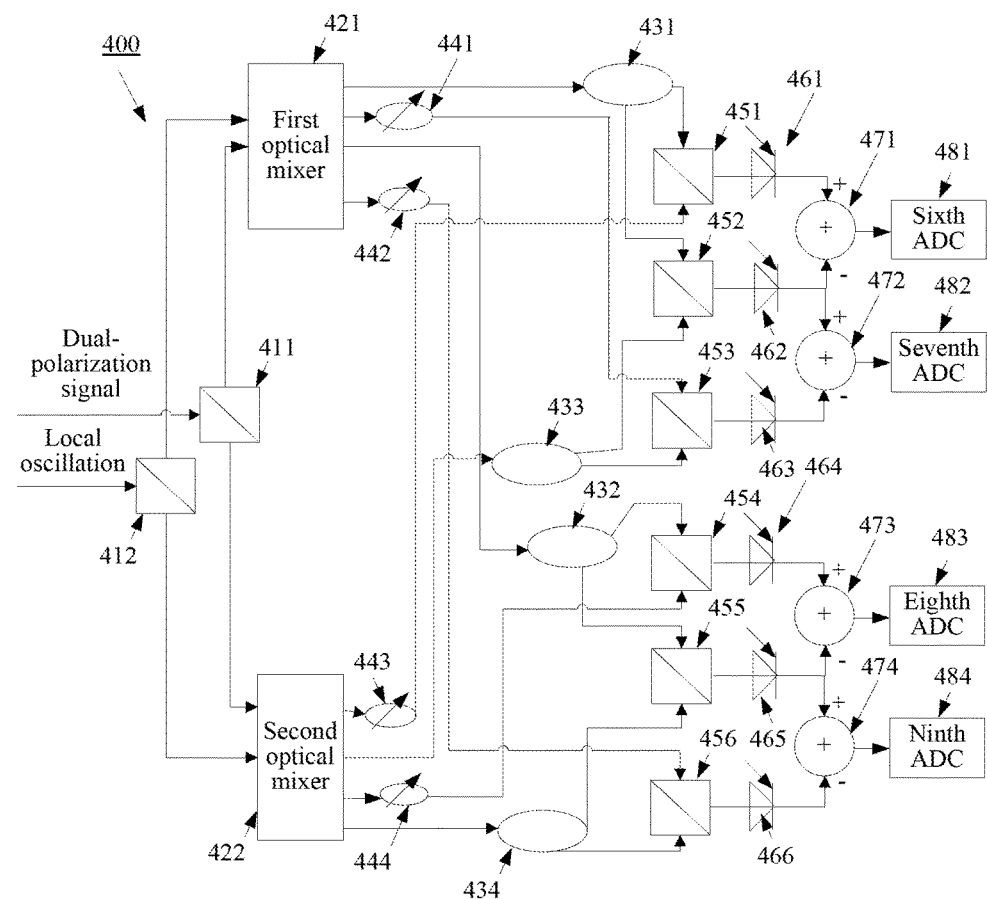
FIG. 4 is a schematic structural diagram of a fifth implementation of a receiver according to an embodiment.

Refer to FIG. 4, which is a schematic structural diagram of another implementation of a receiver according to an embodiment. In the receiver 400, an implementation structure of a signal acquiring unit is the same as those in FIG. 2 and FIG. 3, and details are not repeatedly described herein; a signal diversity unit is composed of a first optical mixer 421, a second optical mixer 422, a fifth PMOC 431 to an eighth PMOC 434, and a third attenuator 441 to a sixth attenuator 444; a signal combination unit is composed of a fourth PBC 451 to a ninth PBC 456, a fourth PD 461 to a ninth PD 466, and a third subtractor 471 to a sixth subtractor 474; and a digital-signal acquiring unit is composed of a sixth ADC 481 to a ninth ADC 484.

In this case, the signal combination unit is further configured to: subtract an electrical signal of a fifth combined signal from an electrical signal of a fourth combined signal, to obtain a quadrature component electrical signal of a dual-polarization signal in a Y polarization direction; subtract an electrical signal of a sixth combined signal from the electrical signal of the fifth combined signal, to obtain a quadrature component electrical signal of the dual-polarization signal in an X polarization direction; subtract an electrical signal of an eighth combined signal from an electrical signal of a seventh combined signal, to obtain an in-phase component electrical signal of the dual-polarization signal in the Y polarization direction; and subtract an electrical signal of a ninth combined signal from the electrical signal of the eighth combined signal, to obtain an in-phase component electrical signal of the dual-polarization signal in the X polarization direction.

The digital-signal acquiring unit includes: a fourth converter, configured to convert the in-phase component electrical signal of the dual-polarization signal in the Y polarization direction, the in-phase component electrical signal of the dual-polarization signal in the X polarization direction, the quadrature component electrical signal of the dual-polarization signal in the Y polarization direction, and the quadrature component electrical signal of the dual-polarization signal in the X polarization direction to digital signals respectively. The fourth converter is composed of the sixth ADC 481 to the ninth ADC 484.

Referring to FIG. 4, a specific structure of the receiver includes.

A first input end of the first optical mixer 421 receives a signal of the dual-polarization signal in the X polarization direction and a signal of a local oscillation in the X polarization direction, and performs coupling and phase-shifting processing on the received signals. A first output end of the first optical mixer 421 is connected to an input end of the fifth PMOC 431 and outputs a fifth signal:

$$\frac{1}{\sqrt{2}} j\vec{E}_{Sx} + \frac{1}{\sqrt{2}} \vec{E}_{LOx}$$

to the fifth PMOC 431; a second output end is connected to an input end of the third attenuator 441 and outputs a sixth signal:

$$\frac{1}{\sqrt{2}} \vec{E}_{Sx} + \frac{1}{\sqrt{2}} j\vec{E}_{LOx}$$

to the third attenuator 441; a third output end is connected to an input end of the sixth PMOC 432 and outputs a seventh signal:

$$-\frac{1}{\sqrt{2}} \vec{E}_{Sx} + \frac{1}{\sqrt{2}} j\vec{E}_{LOx}$$

to the sixth PMOC 432; and a fourth output end is connected to an input end of the fourth attenuator 442 and outputs an eighth signal:

$$\frac{1}{\sqrt{2}} j\vec{E}_{Sx} - \frac{1}{\sqrt{2}} \vec{E}_{LOx}$$

to the fourth attenuator 442.

The second optical mixer 422 receives a signal of the dual-polarization signal in the Y polarization direction and a signal of the local oscillation in the Y polarization direction, and performs coupling and phase-shifting processing on the received signals. A first output end of the second optical mixer 422 is connected to an input end of the fifth attenuator 443 and outputs a ninth signal:

$$\frac{1}{\sqrt{2}} j\vec{E}_{Sy} + \frac{1}{\sqrt{2}} \vec{E}_{LOy}$$

to the fifth attenuator 443; a second output end is connected to an input end of the seventh PMOC 433 and outputs a tenth signal:

$$\frac{1}{\sqrt{2}}\vec{E}_{Sy} + \frac{1}{\sqrt{2}}j\vec{E}_{LOy}$$

to the seventh PMOC 433; a third output end is connected to an input end of the sixth attenuator 444 and outputs an eleventh signal:

$$-\frac{1}{\sqrt{2}}\vec{E}_{Sy} + \frac{1}{\sqrt{2}}j\vec{E}_{LOy}$$

to the sixth attenuator 444; and a fourth output end is connected to an input end of the eighth PMOC 434 and outputs a twelfth signal:

$$\frac{1}{\sqrt{2}}j\vec{E}_{Sy} - \frac{1}{\sqrt{2}}\vec{E}_{LOy}$$

to the eighth PMOC 434.

The fifth PMOC 431 is configured to perform coupling processing on the fifth signal. A first output end is connected to a first input end of the fourth PBC 451 and outputs a seventh coupled signal to the fourth PBC 451, where the seventh coupled signal $\vec{E}_7$ is:

$$\frac{1}{2}j\vec{E}_{Sx} + \frac{1}{2}\vec{E}_{LOx};$$

and a second output end is connected to a first input end of the fifth PBC 452 and outputs an eighth coupled signal to the fifth PBC 452, where the eighth coupled signal $\vec{E}_8$ is:

$$-\frac{1}{2}\vec{E}_{Sx} + \frac{1}{2}j\vec{E}_{LOx}.$$

The third attenuator 441 is configured to perform power attenuation processing on the sixth signal. An output end of the third attenuator 441 is connected to a first input end of the sixth PBC 453 and outputs a ninth coupled signal to the sixth PBC 453, where the ninth coupled signal $\vec{E}_9$ is:

$$\frac{1}{2}\vec{E}_{Sx} + \frac{1}{2}j\vec{E}_{LOx}.$$

The sixth PMOC 432 is configured to perform coupling processing on the seventh signal. A first output end is connected to a first input end of the seventh PBC 454 and outputs a tenth coupled signal to the seventh PBC 454, where the tenth coupled signal $\vec{E}_{10}$ is:

$$-\frac{1}{2}\vec{E}_{Sx} + \frac{1}{2}j\vec{E}_{LOx};$$

and a second output end is connected to a first input end of the eighth PBC 455 and outputs an eleventh coupled signal to the eighth PBC 455, where the eleventh coupled signal $\vec{E}_{11}$ is:

$$-\frac{1}{2}j\vec{E}_{Sx} - \frac{1}{2}\vec{E}_{LOx}.$$

The fourth attenuator 442 is configured to perform power attenuation processing on the eighth signal. An output end of the fourth attenuator 442 is connected to a first input end of the ninth PBC 456 and outputs a twelfth coupled signal to the ninth PBC 456, where the twelfth coupled signal $\vec{E}_{12}$ is:

$$\frac{1}{2}j\vec{E}_{Sx} - \frac{1}{2}\vec{E}_{LOx}.$$

The fifth attenuator 443 is configured to perform power attenuation processing on the ninth signal. An output end of the fifth attenuator 443 is connected to a second input end of the fourth PBC 451 and outputs an thirteenth coupled signal to the fourth PBC 451, where the thirteenth coupled signal $\vec{E}_{13}$ is:

$$\frac{1}{2}j\vec{E}_{Sy} + \frac{1}{2}\vec{E}_{LOy}.$$

The seventh PMOC 433 is configured to perform coupling processing on the tenth signal. A first output end is connected to a second input end of the fifth PBC 452 and outputs a fourteenth coupled signal to the fifth PBC 452, where the fourteenth coupled signal $\vec{E}_{14}$ is:

$$\frac{1}{2}\vec{E}_{Sy} + \frac{1}{2}j\vec{E}_{LOy};$$

and a second output end is connected to a second input end of the sixth PBC 453 and outputs a fifteenth coupled signal to the sixth PBC 453, where the fifteenth coupled signal $\vec{E}_{15}$ is:

$$\frac{1}{2}j\vec{E}_{Sy} - \frac{1}{2}\vec{E}_{LOy}.$$

The sixth attenuator 444 is configured to perform power attenuation processing on the eleventh signal. An output end of the sixth attenuator 444 is connected to a second input end of the seventh PBC 454 and outputs a sixteenth coupled signal to the seventh PBC 454, where the sixteenth coupled signal $\vec{E}_{16}$ is:

$$-\frac{1}{2}\vec{E}_{Sy} + \frac{1}{2}j\vec{E}_{LOy}.$$

The eighth PMOC 434 is configured to perform coupling processing on the twelfth signal. A first output end is connected to a second input end of the eighth PBC 455 and outputs a seventeenth coupled signal to the eighth PBC 455, where the seventeenth coupled signal $\vec{E}_{17}$:

$$\frac{1}{2}j\vec{E}_{Sy} - \frac{1}{2}\vec{E}_{LOy};$$

and a second output end is connected to a second input end of the ninth PBC 456 and outputs an eighteenth coupled signal to the ninth PBC 456, where the eighteenth coupled signal $\vec{E}_{18}$ is:

$$-\frac{1}{2}\vec{E}_{Sy} - \frac{1}{2}j\vec{E}_{LOy}.$$

The fourth PBC 451 is configured to perform polarization beam combination processing on the seventh coupled signal and the thirteenth coupled signal. An output end is connected to an input end of the fourth PD 461 and outputs a fourth combined signal to the fourth PD 461, where the fourth combined signal is a sum of the seventh coupled signal and the thirteenth coupled signal, and specifically, the fourth combined signal is:

$$\vec{E}_{o4} = \begin{bmatrix} \vec{E}_7 \\ \vec{E}_{13} \end{bmatrix} = \frac{1}{2}\begin{bmatrix} j\vec{E}_{Sx} + \vec{E}_{LOx} \\ j\vec{E}_{Sy} + \vec{E}_{LOy} \end{bmatrix}.$$

The fifth PBC 452 is configured to perform polarization beam combination processing on the eighth coupled signal and the fourteenth coupled signal. An output end is connected to an input end of the fifth PD 462 and outputs a fifth combined signal to the fifth PD 462, where the fifth combined signal is a sum of the eighth coupled signal and the fourteenth coupled signal, and specifically, the fifth combined signal is:

$$\vec{E}_{o5} = \begin{bmatrix} \vec{E}_8 \\ \vec{E}_{14} \end{bmatrix} = \frac{1}{2}\begin{bmatrix} -\vec{E}_{Sx} + j\vec{E}_{LOx} \\ \vec{E}_{Sy} + j\vec{E}_{LOy} \end{bmatrix}.$$

The sixth PBC 453 is configured to perform polarization beam combination processing on the ninth coupled signal and the fifteenth coupled signal. An output end is connected to an input end of the sixth PD 463 and outputs a sixth combined signal to the sixth PD 463, where the sixth combined signal is a sum of the ninth coupled signal and the fifteenth coupled signal, and specifically, the sixth combined signal is:

$$\vec{E}_{o6} = \begin{bmatrix} \vec{E}_9 \\ \vec{E}_{15} \end{bmatrix} = \frac{1}{2}\begin{bmatrix} \vec{E}_{Sx} + j\vec{E}_{LOx} \\ j\vec{E}_{Sy} - \vec{E}_{LOy} \end{bmatrix}.$$

The seventh PBC 454 is configured to perform polarization beam combination processing on the tenth coupled signal and the sixteenth coupled signal. An output end is connected to an input end of the seventh PD 464 and outputs a seventh combined signal to the seventh PD 464, where the seventh combined signal is a sum of the tenth coupled signal and the sixteenth coupled signal, and specifically, the seventh combined signal is:

$$\vec{E}_{o7} = \begin{bmatrix} \vec{E}_{10} \\ \vec{E}_{16} \end{bmatrix} = \frac{1}{2}\begin{bmatrix} -\vec{E}_{Sx} + j\vec{E}_{LOx} \\ -\vec{E}_{Sy} + j\vec{E}_{LOy} \end{bmatrix}.$$

The eighth PBC 455 is configured to perform polarization beam combination processing on the eleventh coupled signal and the seventeenth coupled signal. An output end is connected to an input end of the eighth PD 465 and outputs an eighth combined signal to the eighth PD 465, where the eighth combined signal is a sum of the eleventh coupled signal and the seventeenth coupled signal, and specifically, the eighth combined signal is:

$$\vec{E}_{o8} = \begin{bmatrix} \vec{E}_{11} \\ \vec{E}_{17} \end{bmatrix} = \frac{1}{2}\begin{bmatrix} -j\vec{E}_{Sx} - \vec{E}_{LOx} \\ j\vec{E}_{Sy} - \vec{E}_{LOy} \end{bmatrix}.$$

The ninth PBC 456 is configured to perform polarization beam combination processing on the twelfth coupled signal and the eighteenth coupled signal. An output end is connected to an input end of the ninth PD 466 and outputs a ninth combined signal to the ninth PD 466, where the ninth combined signal is a sum of the twelfth coupled signal and the eighteenth coupled signal, and specifically, the ninth combined signal is:

$$\vec{E}_{o9} = \begin{bmatrix} \vec{E}_{12} \\ \vec{E}_{18} \end{bmatrix} = \frac{1}{2}\begin{bmatrix} \vec{E}_{Sx} + j\vec{E}_{LOx} \\ j\vec{E}_{Sy} - \vec{E}_{LOy} \end{bmatrix}.$$

The fourth PD 461 is configured to convert the fourth combined signal to an electrical signal. An output end is connected to a positive input end of the third subtractor 471 and outputs the electrical signal of the fourth combined signal, where specifically, the electrical signal of the fourth combined signal is:

$$I_4 \propto |j\vec{E}_{Sx} + \vec{E}_{LOx}|^2 + |j\vec{E}_{Sy} + \vec{E}_{LOy}|^2 = |\vec{E}_S|^2 + |\vec{E}_{LO}|^2 + 2RE\{[j\vec{E}_{Sx}\vec{E}^*_{LOx} + j\vec{E}_{Sy}\vec{E}^*_{LOy}]\}.$$

The fifth PD 462 is configured to convert the fifth combined signal to an electrical signal. An output end is connected to both a positive input end of the fourth subtractor 472 and a negative input end of the third subtractor 471, and outputs the electrical signal of the fifth combined signal, where specifically, the electrical signal of the fifth combined signal is:

$$I_5 \propto |-\vec{E}_{Sx} + j\vec{E}_{LOx}|^2 + |\vec{E}_{Sy} + j\vec{E}_{LOy}|^2 = |\vec{E}_S|^2 + |\vec{E}_{LO}|^2 + 2RE\{[j\vec{E}_{Sx}\vec{E}^*_{LOx} - j\vec{E}_{Sy}\vec{E}^*_{LOy}]\}.$$

The sixth PD 463 is configured to convert the sixth combined signal to an electrical signal. An output end is connected to a negative input end of the fourth subtractor 472 and outputs the electrical signal of the sixth combined signal, where specifically, the electrical signal of the sixth combined signal is:

$$I_6 \propto |-\vec{E}_{Sx} + j\vec{E}_{LOx}|^2 + |j\vec{E}_{Sy} - \vec{E}_{LOy}|^2 = |\vec{E}_S|^2 + |\vec{E}_{LO}|^2 + 2RE\{[-j\vec{E}_{Sx}\vec{E}^*_{LOx} - j\vec{E}_{Sy}\vec{E}^*_{LOy}]\}.$$

The seventh PD 464 is configured to convert the seventh combined signal to an electrical signal. An output end is connected to a positive input end of the fifth subtractor 473 and outputs the electrical signal of the seventh combined signal, where specifically, the electrical signal of the seventh combined signal is:

$$I_7 \propto |-\vec{E}_{Sx}+j\vec{E}_{LOx}|^2+|-\vec{E}_{Sy}+j\vec{E}_{LOy}|^2 = |\vec{E}_S|^2+|\vec{E}_{LO}|^2+2RE\{[j\vec{E}_{Sx}\vec{E}^*_{LOx}-j\vec{E}_{Sy}\vec{E}^*_{LOy}]\}.$$

The eighth PD 465 is configured to convert the eighth combined signal to an electrical signal. An output end is connected to both a negative input end of the fifth subtractor 473 and a positive input end of the sixth subtractor 474, and outputs the electrical signal of the eighth combined signal, where specifically, the electrical signal of the eighth combined signal is:

$$I_8 \propto |-j\vec{E}_{Sx}-\vec{E}_{LOx}|^2+|j\vec{E}_{Sy}-\vec{E}_{LOy}|^2 = |\vec{E}_S|^2+|\vec{E}_{LO}|^2+2RE\{[j\vec{E}_{Sx}\vec{E}^*_{LOx}-j\vec{E}_{Sy}\vec{E}^*_{LOy}]\}.$$

The ninth PD 466 is configured to convert the ninth combined signal to an electrical signal. An output end is connected to a negative input end of the sixth subtractor 474 and outputs the electrical signal of the ninth combined signal, where specifically, the electrical signal of the ninth combined signal is:

$$I_9 \propto |\vec{E}_{Sx}+j\vec{E}_{LOx}|^2+|j\vec{E}_{Sy}-\vec{E}_{LOy}|^2 = |\vec{E}_S|^2+|\vec{E}_{LO}|^2+2RE\{[-j\vec{E}_{Sx}\vec{E}^*_{LOx}-j\vec{E}_{Sy}\vec{E}^*_{LOy}]\}.$$

The third subtractor 471 is configured to subtract the electrical signal of the fifth combined signal from the electrical signal of the fourth combined signal, to obtain the quadrature component electrical signal of the dual-polarization signal in the Y polarization direction, and outputs the quadrature component electrical signal of the dual-polarization signal in the Y polarization direction to the sixth ADC 481 through an output end, where specifically, the quadrature component electrical signal of the dual-polarization signal in the Y polarization direction is:

$$Q_{ty}=I_4-I_5=-4IM\{\vec{E}_{Sy}\vec{E}^*_{LOy}\}.$$

The fourth subtractor 472 is configured to subtract the electrical signal of the sixth combined signal from the electrical signal of the fifth combined signal, to obtain the quadrature component electrical signal of the dual-polarization signal in the X polarization direction, and outputs the quadrature component electrical signal of the dual-polarization signal in the X polarization direction to the seventh ADC 482 through an output end, where specifically, the quadrature component electrical signal of the dual-polarization signal in the X polarization direction is:

$$Q_{tx}=I_5-I_5=-4IM\{\vec{E}_{Sx}\vec{E}^*_{LOx}\}.$$

The fifth subtractor 473 is configured to subtract the electrical signal of the eighth combined signal from the electrical signal of the seventh combined signal, to obtain the in-phase component electrical signal of the dual-polarization signal in the Y polarization direction, and outputs the in-phase component electrical signal of the dual-polarization signal in the Y polarization direction to the eighth ADC 483 through an output end, where specifically, the in-phase component electrical signal of the dual-polarization signal in the Y polarization direction is:

$$I_{zy}=I_7-I_8=4Re\{\vec{E}_{Sy}\vec{E}^*_{LOy}\}.$$

The sixth subtractor 474 is configured to subtract the electrical signal of the ninth combined signal from the electrical signal of the eighth combined signal, to obtain the in-phase component electrical signal of the dual-polarization signal in the X polarization direction, and outputs the in-phase component electrical signal of the dual-polarization signal in the X polarization direction to the ninth ADC 484 through an output end, where specifically, the in-phase component electrical signal of the dual-polarization signal in the X polarization direction is:

$$I_{zx}=I_8-I_9=4Re\{\vec{E}_{Sx}\vec{E}^*_{LOx}\}.$$

The sixth ADC 481 is configured to convert the quadrature component electrical signal of the dual-polarization signal in the Y polarization direction to a digital signal.

The seventh ADC 482 is configured to convert the quadrature component electrical signal of the dual-polarization signal in the X polarization direction to a digital signal.

The eighth ADC 483 is configured to convert the in-phase component electrical signal of the dual-polarization signal in the Y polarization direction to a digital signal.

The ninth ADC 484 is configured to convert the in-phase component electrical signal of the dual-polarization signal in the X polarization direction to a digital signal.

Figure 4A:
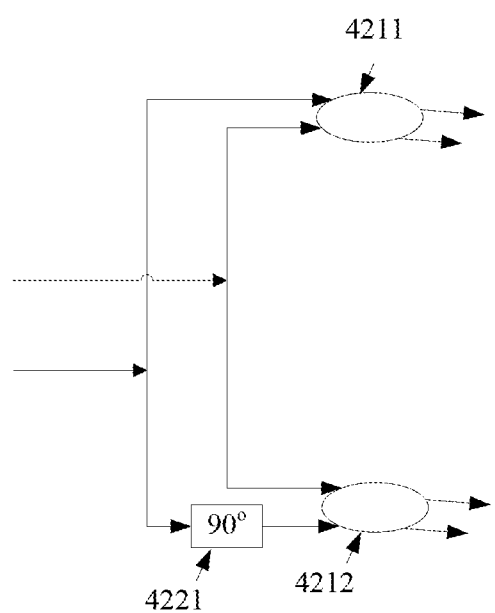
FIG. 4A is a schematic structural diagram of an implementation of an optical mixer according to an embodiment.

Referring to FIG. 4A, both the first optical mixer and the second optical mixer may be implemented by using the following structure:

A first input end of the optical mixer is connected to both a first input end of a ninth PMOC 4211 and a first input end of a tenth PMOC 4212; a second input end of the optical mixer is connected to both a second input end of the ninth PMOC 4211 and an input end of a phase shifter 4221; an output end of the phase shifter 4221 is connected to a second input end of the tenth PMOC 4212. A first output end of the ninth PMOC 4211 is connected to a first output end of the optical mixer; a second output end of the ninth PMOC 4211 is connected to a second output end of the optical mixer. A first output end of the tenth PMOC 4212 is connected to a third output end of the optical mixer; a second output end of the tenth PMOC 4212 is connected to a fourth output end of the optical mixer.

Similar to the receiver shown in FIG. 2, based on a purpose of making signal powers received at two input ends of each of the third subtractor 471 to the sixth subtractor 474 be equal, in actual application, in the structure of the receiver shown in FIG. 4, a power balance unit may be disposed between the output end of the fifth PD 462 and the input ends of the third subtractor 471 and the fourth subtractor 472, to increase power of the electrical signal of the fifth combined signal that is output by the fifth PD 462 to the input ends of the third subtractor 471 and the fourth subtractor 472; a power balance unit may also be disposed between the output end of the eighth PD 465 and the input ends of the fifth subtractor 473 and the sixth subtractor 474, to increase power of the electrical signal of the eighth combined signal that is output by the eighth PD 465 to the input ends of the fifth subtractor 473 and the sixth subtractor 474. The power balance unit may be implemented by using a power amplifier or the like.

Figure 4B:
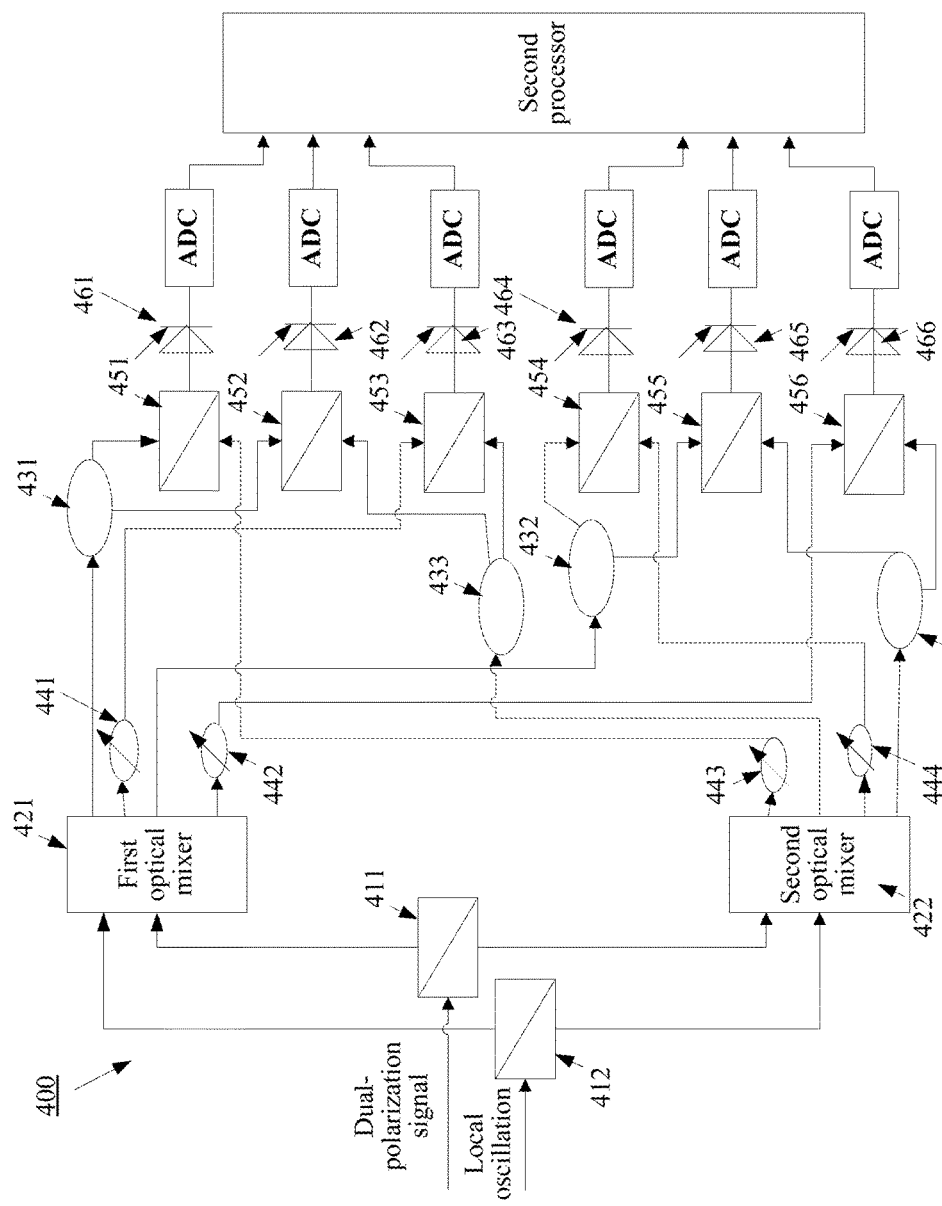
FIG. 4B is a schematic structural diagram of a sixth implementation of a receiver according to an embodiment.

In the structure of the receiver shown in FIG. 4, the signal combination unit may not include subtractors, and the digital-signal acquiring unit is composed of six ADCs and a second processor, as shown in FIG. 4B.

A third converter, composed of six ADCs, is configured to convert received electrical signals of combined signals to digital signals of the combined signals respectively.

The second processor is connected to an output end of a third converter and is configured to: subtract a digital signal of the electrical signal of the fifth combined signal from a digital signal, output by the third converter, of the electrical signal of the fourth combined signal, to obtain a digital signal of a quadrature component electrical signal of the dual-polarization signal in the Y polarization direction; subtract a digital signal of the electrical signal of the sixth combined signal from the digital signal, output by the third converter, of the electrical signal of the fifth combined signal, to obtain a digital signal of a quadrature component electrical signal of the dual-polarization signal in the X polarization direction; subtract a digital signal of the electrical signal of the eighth combined signal from a digital signal, output by the third converter, of the electrical signal of the seventh combined signal, to obtain a digital signal of an in-phase component electrical signal of the dual-polarization signal in the Y polarization direction; and subtract a digital signal of the electrical signal of the ninth combined signal from the digital signal, output by the third converter, of the electrical signal of the eighth combined signal, to obtain a digital signal of an in-phase component electrical signal of the dual-polarization signal in the X polarization direction.

Specific functions of the ADCs and an implementation principle of the receiver may be obtained by appropriately changing the switch embodiment shown in FIG. 3, and details are not repeatedly described herein.

Figure 5:
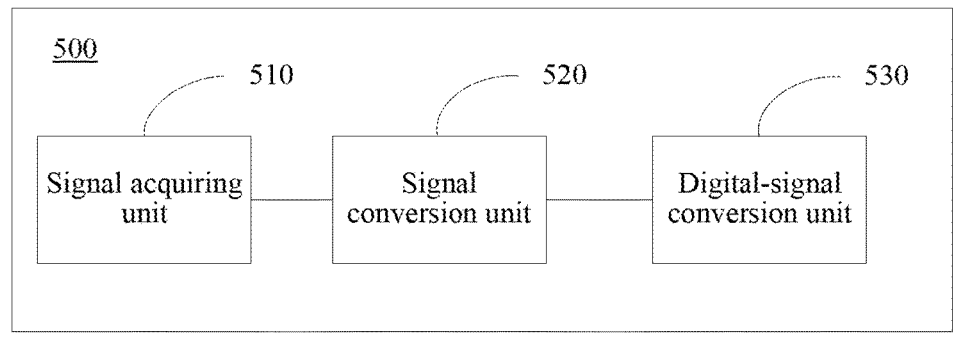
FIG. 5 is a schematic structural diagram of a seventh implementation of a receiver according to an embodiment.

Refer to FIG. 5, which is another schematic structural diagram of a receiver according to an embodiment. The receiver 500 includes: a signal acquiring unit 510, configured to receive a dual-polarization signal and perform polarization beam splitting processing on the dual-polarization signal, to obtain signals of the dual-polarization signal in both X and Y polarization directions; a signal conversion unit 520, connected to the signal acquiring unit 510 and configured to convert the signals of the dual-polarization signal in both X and Y polarization directions to electrical signals respectively; and a digital-signal conversion unit 530, connected to the signal conversion unit 520 and configured to convert the electrical signals output by the signal conversion unit 520 to digital signals respectively; where in the dual-polarization signal, data in every three frames is a unit, and structures of the data in three frames successively include: $\vec{E}_{Sx}$ and $\vec{E}_{Sy}$, $\vec{E}_{Sx}$ and $-\vec{E}_{Sy}$, and $-\vec{E}_{Sx}$ and $-\vec{E}_{Sy}$, where $\vec{E}_{Sx}$ is the signal of the dual-polarization signal in the X polarization direction, and $\vec{E}_{Sy}$ is the signal of the dual-polarization signal in the Y polarization direction. The structures of the data in three frames also mean that $\vec{E}_{Sx}$ and $\vec{E}_{Sy}$ are sent in a first frame, $\vec{E}_{Sx}$ and reversed $\vec{E}_{Sy}$ are sent in a second frame, and reversed $\vec{E}_{Sx}$ and reversed $\vec{E}_{Sy}$ are sent in a third frame.

Figure 6:
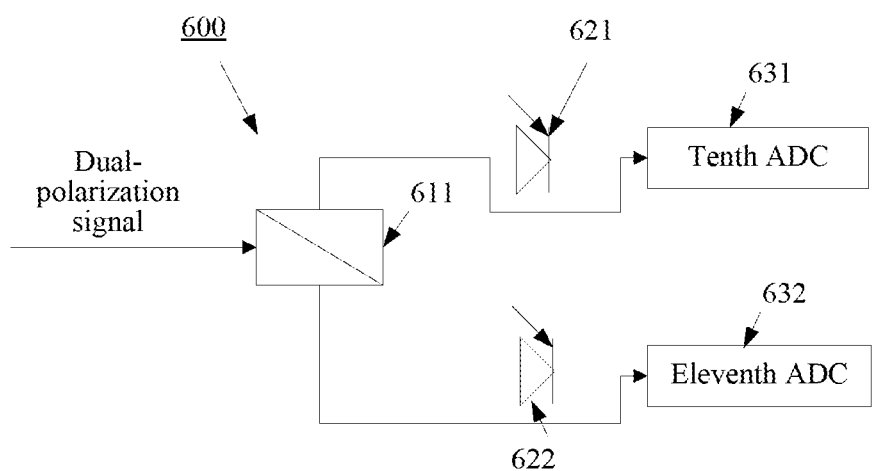
FIG. 6 is a schematic structural diagram of an eighth implementation of a receiver according to an embodiment.

Referring to FIG. 6, the signal acquiring unit may include: an input end of the third PBS 611 receives the dual-polarization signal, a first output end of the third PBS 611 outputs the signal of the dual-polarization signal in the X polarization direction, and a second output end of the third PBS 611 outputs the signal of the dual-polarization signal in the Y polarization direction.

The signal conversion unit may include: a tenth PD 621, where an input end is connected to the first output end of the third PBS 611 and receives the signal of the dual-polarization signal in the X polarization direction, and an output end outputs the electrical signal of the signal of the dual-polarization signal in the X polarization direction; and an eleventh PD 622, where an input end is connected to the second output end of the third PBS 611 and receives the signal of the dual-polarization signal in the Y polarization direction, and an output end outputs the electrical signal of the signal of the dual-polarization signal in the Y polarization direction.

The digital-signal conversion unit 530 may include: a tenth ADC 631, where an input end is connected to the output end of the tenth PD 621, to convert the electrical signal of the signal of the dual-polarization signal in the X polarization direction to a digital signal; and an eleventh ADC 632, where an input end is connected to the output end of the eleventh PD 622, to convert the electrical signal of the signal of the dual-polarization signal in the Y polarization direction to a digital signal.

In this embodiment, because a dual-polarization signal received by a receiver has a specific structure, receiving of the dual-polarization signal is implemented, and SSBI can also be eliminated from the dual-polarization signal.

A person skilled in the art may clearly understand that, the technologies in the embodiments may be implemented by software in addition to a necessary general hardware platform. Based on such an understanding, the technical solutions essentially or the part contributing to the prior art may be implemented in a form of a software product. The software product is stored in a storage medium, such as a ROM/RAM, a hard disk, or an optical disc, and includes several instructions for instructing a computer device (which may be a personal computer, a server, or a network device) to perform the methods described in the embodiments or some parts of the embodiments.

The embodiments in this specification are all described in a progressive manner, for same or similar parts in the embodiments, reference may be made to these embodiments, and each embodiment focuses on a difference from other embodiments. Especially, a system embodiment is basically similar to a method embodiment, and therefore is described briefly; for related parts, reference may be made to partial descriptions in the method embodiment.

The foregoing descriptions are implementation manners, but are not intended to limit the protection scope. Any modification, equivalent replacement, and improvement made without departing from the spirit and principle shall fall within the protection scope.

What is claimed is:

1. A receiver, comprising:
   an optical signal acquisition unit, configured to:
      receive a dual-polarization signal;
      receive a local oscillation;
      perform polarization beam splitting processing on the dual-polarization signal to obtain signals of the dual-polarization signal in an X polarization direction and a Y polarization direction;
      perform polarization beam splitting processing on the local oscillation, separately, to obtain signals of the local oscillation in an X polarization direction and a Y polarization direction;
   an optical signal diversity unit connected to the optical signal acquisition unit, wherein the optical signal diversity unit is configured to:
      perform coupling processing on the signal of the dual-polarization signal in the X polarization direction;
      perform coupling processing on the signal of the local oscillation in the X polarization direction;
      obtain X polarized coupled signals with different phase shifts in the X polarization direction in accordance with the coupling processed dual-polarization signal in the X polarization direction and the coupling processed local oscillation in the X polarization direction;

perform coupling processing on the signal of the dual-polarization signal in the Y polarization direction;
perform coupling processing on the signal of the local oscillation in the Y polarization direction; and
obtain Y polarized coupled signals with different phase shifts in the Y polarization direction in accordance with the coupling processed dual-polarization signal in the Y polarization direction and the coupling processed local oscillation in the Y polarization direction;

a signal combination unit connected to the optical signal diversity unit, wherein the signal combination unit is configured to:
perform signal combination on a group of one coupled signal in the X polarization direction and one coupled signal in the Y polarization direction, to obtain a combined signal; and
convert the combined signal to an electrical signal; and a digital-signal acquisition unit connected to the signal combination unit, wherein the digital-signal acquisition unit is configured to:
receive electrical signals; and
generate a digital signal of an electrical signal of the dual-polarization signal in the X polarization direction and a digital signal of an electrical signal of the dual-polarization signal in the Y polarization direction according to the electrical signals.

2. The receiver according to claim 1, wherein the optical signal acquisition unit comprises:
a first polarization beam splitter (PBS), wherein an input end of the first PBS is configured to receive the dual-polarization signal, a first output end of the first PBS is configured to output the signal of the dual-polarization signal in the X polarization direction, and a second output end of the first PBS is configured to output the signal of the dual-polarization signal in the Y polarization direction; and
a second PBS, wherein an input end of the second PBS is configured to receive the local oscillation, a first output end of the second PBS is configured to output the signal of the local oscillation in the X polarization direction, and a second output end of the second PBS is configured to output the signal of the local oscillation in the Y polarization direction.

3. The receiver according to claim 2, wherein the optical signal diversity unit comprises:
a first polarization maintaining optical coupler (PMOC), wherein a first input end of the first PMOC is connected to the first output end of the first PBS, wherein the first input end of the first PMOC is configured to receive the signal of the dual-polarization signal in the X polarization direction, wherein a second input end of the first PMOC is connected to the first output end of the second PBS, wherein the second input end of the first PMOC is configured to receive the signal of the local oscillation in the X polarization direction, wherein a first output end of the first PMOC is connected to an input end of a second PMOC, wherein the first output end of the first PMOC is configured to output a first signal to the second PMOC, wherein the first signal is:

$$\frac{1}{\sqrt{2}} j\vec{E}_{Sx} + \frac{1}{\sqrt{2}} \vec{E}_{LOx},$$

wherein a second output end of the first PMOC is connected to an input end of a first attenuator, wherein the second output end of the first PMOC is configured to output a second signal to the first attenuator, and wherein the second signal is:

$$\frac{1}{\sqrt{2}} \vec{E}_{Sx} + \frac{1}{\sqrt{2}} j\vec{E}_{LOx};$$

the second PMOC, wherein a first output end of the second PMOC is configured to output a first coupled signal, wherein the first coupled signal is:

$$\frac{1}{2} j\vec{E}_{Sx} + \frac{1}{2} \vec{E}_{LOx},$$

wherein a second output end of the second PMOC is configured to output a second coupled signal, and wherein the second coupled signal is:

$$-\frac{1}{2}\vec{E}_{Sx} + \frac{1}{2} j\vec{E}_{LOx};$$

the first attenuator, wherein an output end of the first attenuator is configured to output a third coupled signal, and wherein the third coupled signal is:

$$\frac{1}{2}\vec{E}_{Sx} + \frac{1}{2} j\vec{E}_{LOx};$$

and
a third PMOC, wherein a first input end of the third PMOC is connected to the second output end of the first PBS, wherein the first input end of the third PMOC is configured to receive the signal of the dual-polarization signal in the Y polarization direction, wherein a second input end of the third PMOC is connected to the second output end of the second PBS, wherein the second input end of the third PMOC is configured to receive the signal of the local oscillation in the Y polarization direction, wherein a first output end of the third PMOC is connected to an input end of a second attenuator, wherein the first output end of the third PMOC is configured to output a third signal to the second attenuator, wherein the third signal is:

$$\frac{1}{\sqrt{2}} j\vec{E}_{Sy} + \frac{1}{\sqrt{2}} \vec{E}_{LOy},$$

wherein a second output end of the third PMOC is connected to an input end of a fourth PMOC, wherein the second output end of the third PMOC is configured to output a fourth signal to the fourth PMOC, wherein the fourth signal is:

$$\frac{1}{\sqrt{2}} \vec{E}_{Sy} + \frac{1}{\sqrt{2}} j\vec{E}_{LOy};$$

the second attenuator, wherein an output end of the second attenuator is configured to output a fourth coupled signal, wherein the fourth coupled signal is:

$$\frac{1}{2}j\vec{E}_{Sy} + \frac{1}{2}\vec{E}_{LOy};$$

and
a fourth PMOC, wherein a first output end of the fourth PMOC is configured to output a fifth coupled signal, wherein the fifth coupled signal is:

$$\frac{1}{2}\vec{E}_{Sy} + \frac{1}{2}j\vec{E}_{LOy},$$

wherein a second output end of the fourth PMOC is configured to output a sixth coupled signal, and wherein the sixth coupled signal is:

$$\frac{1}{2}j\vec{E}_{Sy} - \frac{1}{2}\vec{E}_{LOy};$$

and
wherein $\vec{E}_{Sx}$ is the signal of the dual-polarization signal in the X polarization direction, $\vec{E}_{Sy}$ the signal of the dual-polarization signal in the Y polarization direction, $\vec{E}_{LOx}$ is the signal of the local oscillation in the X polarization direction, and $\vec{E}_{LOy}$ is the signal of the local oscillation in the Y polarization direction.

4. The receiver according to claim 3, wherein the signal combination unit comprises:
a first polarization beam combiner (PBC), wherein a first input end of the first PBC is connected to the first output end of the second PMOC, wherein the first input end of the first PBC is configured to receive the first coupled signal, wherein a second input end of the first PBC is connected to the output end of the second attenuator, wherein the second input end of the first PBC is configured to receive the fourth coupled signal, wherein an output end of the first PBC is connected to an input end of a first photoelectric detector (PD), wherein the output end of the first PBC is configured to output a first combined signal to the first PD, and wherein the first combined signal is a sum of the first coupled signal and the fourth coupled signal;
a second PBC, wherein a first input end of the second PBC is connected to the second output end of the second PMOC, wherein the first input end of the second PBC is configured to receive the second coupled signal, wherein a second input end of the second PBC is connected to the first output end of the fourth PMOC, wherein the second input end of the second PBC is configured to receive the fifth coupled signal, wherein an output end of the second PBC is connected to an input end of a second PD, wherein the output end of the second PBC is configured to output a second combined signal to the second PD, and wherein the second combined signal is a sum of the second coupled signal and the fifth coupled signal;
a third PBC, wherein a first input end of the third PBC is connected to the output end of the first attenuator, wherein the first input end of the third PBC is configured to receive the third coupled signal, wherein a second input end of the third PBC is connected to the second output end of the fourth PMOC, wherein the second input end of the third PBC is configured to receive the sixth coupled signal, wherein an output end of the third PBC is connected to an input end of a third PD, wherein the output end of the third PBC is configured to output a third combined signal to the third PD, and wherein the third combined signal is a sum of the third coupled signal and the sixth coupled signal;
the first PD, wherein an output end of the first PD is configured to output an electrical signal of the first combined signal;
the second PD, wherein an output end of the second PD is configured to output an electrical signal of the second combined signal; and
the third PD, wherein an output end of the third PD is configured to output an electrical signal of the third combined signal.

5. The receiver according to claim 4, wherein the digital-signal acquisition unit comprises:
a first converter, configured to convert the first combined signal to a first combined digital signal, the second combined signal to a second combined digital signal, and the third combined signal to a third digital combined signal; and
a first processor, wherein the first processor is connected to an output end of the first converter; and
a non-transitory computer readable storage medium storing a program for execution by the first processor, the program including instructions to:
perform subtraction sequentially on two successive digital signals of the electrical signals of the first combined signal to the third combined signal; and
obtain a digital signal of the electrical signal of the dual-polarization signal in the X polarization direction and a digital signal of the electrical signal of the dual-polarization signal in the Y polarization direction.

6. The receiver according to claim 4, wherein the signal combination unit is further configured to:
subtract the electrical signal of the second combined signal from the electrical signal of the first combined signal, to obtain the electrical signal of the dual-polarization signal in the Y polarization direction; and
subtract the electrical signal of the third combined signal from the electrical signal of the second combined signal, to obtain the electrical signal of the dual-polarization signal in the X polarization direction; and
wherein the digital-signal acquisition unit comprises a second converter, configured to convert the electrical signal of the dual-polarization signal in the X polarization direction to a digital X polarization signal and the electrical signal of the dual-polarization signal in the Y polarization direction to a digital Y polarization signal.

7. The receiver according to claim 6, wherein the signal combination unit further comprises:
a first subtractor, wherein a positive input end of the first subtractor is connected to the output end of the first PD, wherein the positive input end of the first subtractor is configured to input the electrical signal of the first combined signal, wherein a negative input end of the first subtractor is connected to the output end of the second PD, wherein the negative input end of the first subtractor is configured to input the electrical signal of the second combined signal, and wherein an output end of the first subtractor is configured to output the electrical signal of the dual-polarization signal in the Y polarization direction; and a second subtractor, wherein a positive input end of the second subtractor is connected to the output end of the second PD, wherein the positive input end of the second subtractor is configured to input the electrical signal of the second combined signal, wherein a negative input end of the second subtractor is connected to the output end of the third PD, wherein the negative input end of the second subtractor is configured to input the electrical signal of the third combined signal, and wherein an output end of the second subtractor is configured to output the electrical signal of the dual-polarization signal in the X polarization direction.

8. The receiver according to claim 2, wherein the optical signal diversity unit comprises:

a first optical mixer, wherein a first input end of the first optical mixer is connected to the first output end of the first PBS, wherein the first input end of the first optical mixer is configured to receive the signal of the dual-polarization signal in the X polarization direction, wherein a second input end of the first optical mixer is connected to the first output end of the second PBS, wherein the second input end of the first optical mixer is configured to receive the signal of the local oscillation in the X polarization direction, wherein a first output end of the first optical mixer is connected to an input end of a fifth PMOC, wherein the first output end of the first optical mixer is configured to output a fifth signal to the fifth PMOC, wherein the fifth signal is:

$$\frac{1}{\sqrt{2}} j\vec{E}_{Sx} + \frac{1}{\sqrt{2}} \vec{E}_{LOx},$$

wherein a second output end of the first optical mixer is connected to an input end of a third attenuator, wherein the second output end of the first optical mixer is configured to output a sixth signal to the third attenuator, wherein the sixth signal is:

$$\frac{1}{\sqrt{2}} \vec{E}_{Sx} + \frac{1}{\sqrt{2}} j\vec{E}_{LOx},$$

wherein a third output end of the first optical mixer is connected to an input end of a sixth PMOC, wherein the third output end of the first optical mixer is configured to output a seventh signal to the sixth PMOC, wherein the seventh signal is:

$$-\frac{1}{\sqrt{2}} \vec{E}_{Sx} + \frac{1}{\sqrt{2}} j\vec{E}_{LOx},$$

wherein a fourth output end of the first optical mixer is connected to an input end of a fourth attenuator, wherein the fourth output end of the first optical mixer is configured to output an eighth signal to the fourth attenuator, wherein the eighth signal is:

$$-\frac{1}{\sqrt{2}} \vec{E}_{Sx} + \frac{1}{\sqrt{2}} j\vec{E}_{LOx};$$

the fifth PMOC, wherein a first output end of the fifth PMOC is configured to output a seventh coupled signal, wherein the seventh coupled signal is:

$$\frac{1}{2} j\vec{E}_{Sx} + \frac{1}{2} \vec{E}_{LOx},$$

wherein a second output end of the fifth PMOC is configured to output an eighth coupled signal, and wherein the eighth coupled signal is:

$$-\frac{1}{2} \vec{E}_{Sx} + \frac{1}{2} j\vec{E}_{LOx};$$

the third attenuator, wherein an output end of the third attenuator is configured to output a ninth coupled signal, wherein the ninth coupled signal is:

$$\frac{1}{2} \vec{E}_{Sx} + \frac{1}{2} j\vec{E}_{LOx};$$

the sixth PMOC, wherein a first output end of the sixth PMOC is configured to output a tenth coupled signal, wherein the tenth coupled signal is:

$$-\frac{1}{2} \vec{E}_{Sx} + \frac{1}{2} j\vec{E}_{LOx},$$

wherein a second output end of the sixth PMOC is configured to output an eleventh coupled signal, and wherein the eleventh coupled signal is:

$$-\frac{1}{2} j\vec{E}_{Sx} - \frac{1}{2} \vec{E}_{LOx};$$

the fourth attenuator, wherein an output end of the fourth attenuator is configured to output a twelfth coupled signal, wherein the twelfth coupled signal is:

$$\frac{1}{2} j\vec{E}_{Sx} - \frac{1}{2} \vec{E}_{LOx};$$

a second optical mixer, wherein a first input end of the second optical mixer is connected to the second output end of the first PBS, wherein the first input end of the second optical mixer is configured to receive the signal of the dual-polarization signal in the Y polarization direction, wherein a second input end of the second optical mixer is connected to the second output end of the second PBS, wherein the second input end of the second optical mixer is configured to receive the signal of the local oscillation in the Y polarization direction, wherein a first output end of the second optical mixer is connected to an input end of a fifth attenuator, wherein the first output end of the second optical mixer is configured to output a ninth signal to the fifth attenuator, wherein the ninth signal is:

$$\frac{1}{\sqrt{2}}j\vec{E}_{Sy} + \frac{1}{\sqrt{2}}\vec{E}_{LOy},$$

wherein a second output end of the second optical mixer is connected to an input end of a seventh PMOC, wherein the second output end of the second optical mixer is configured to output a tenth signal to the seventh PMOC, wherein the tenth signal is:

$$\frac{1}{\sqrt{2}}\vec{E}_{Sy} + \frac{1}{\sqrt{2}}j\vec{E}_{LOy},$$

wherein a third output end of the second optical mixer is connected to an input end of a sixth attenuator, wherein the third output end of the second optical mixer is configured to output an eleventh signal to the sixth attenuator, wherein the eleventh signal is:

$$-\frac{1}{\sqrt{2}}\vec{E}_{Sy} + \frac{1}{\sqrt{2}}j\vec{E}_{LOy},$$

wherein a fourth output end of the second optical mixer is connected to an input end of an eighth PMOC, wherein the fourth output end of the second optical mixer is configured to output a twelfth signal to the eighth PMOC, and wherein the twelfth signal is:

$$\frac{1}{\sqrt{2}}j\vec{E}_{Sy} - \frac{1}{\sqrt{2}}\vec{E}_{LOy};$$

the fifth attenuator, wherein an output end of the fifth attenuator is configured to output a thirteenth coupled signal, and wherein the thirteenth coupled signal is:

$$\frac{1}{2}j\vec{E}_{Sy} + \frac{1}{2}\vec{E}_{LOy};$$

the seventh PMOC, wherein a first output end of the seventh PMOC is configured to output a fourteenth coupled signal, wherein the fourteenth coupled signal is:

$$\frac{1}{2}\vec{E}_{Sy} + \frac{1}{2}j\vec{E}_{LOy},$$

wherein a second output end of the seventh PMOC is configured to output a fifteenth coupled signal, and wherein the fifteenth coupled signal is:

$$\frac{1}{2}j\vec{E}_{Sy} - \frac{1}{2}\vec{E}_{LOy};$$

the sixth attenuator, wherein an output end of the sixth attenuator is configured to output a sixteenth coupled signal, wherein the sixteenth coupled signal is:

$$-\frac{1}{2}\vec{E}_{Sy} + \frac{1}{2}j\vec{E}_{LOy};$$

and the eighth PMOC, wherein a first output end of the eighth PMOC is configured to output a seventeenth coupled signal, wherein the seventeenth coupled signal is:

$$\frac{1}{2}j\vec{E}_{Sy} - \frac{1}{2}\vec{E}_{LOy},$$

wherein a second output end of the eighth PMOC is configured to output an eighteenth coupled signal, and wherein the eighteenth coupled signal is:

$$-\frac{1}{2}\vec{E}_{Sy} - \frac{1}{2}j\vec{E}_{LOy};$$

and wherein $\vec{E}_{Sx}$ is the signal of the dual-polarization signal in the X polarization direction, $\vec{E}_{Sy}$ the signal of the dual-polarization signal in the Y polarization direction, $\vec{E}_{LOx}$ is the signal of the local oscillation in the X polarization direction, and $\vec{E}_{LOy}$ is the signal of the local oscillation in the Y polarization direction.

9. The receiver according to claim 8, wherein the signal combination unit comprises:
a fourth PBC, wherein a first input end of the fourth PBC is connected to the first output end of the fifth PMOC, wherein the first input end of the fourth PBC is configured to receive the seventh coupled signal, wherein a second input end of the fourth PBC is connected to the output end of the fifth attenuator, wherein the second input end of the fourth PBC is configured to receive the thirteenth coupled signal, wherein an output end of the fourth PBC is connected to an input end of a fourth PD, wherein the output end of the fourth PBC is configured to output a fourth combined signal to the fourth PD, and wherein the fourth combined signal is a sum of the seventh coupled signal and the thirteenth coupled signal;
a fifth PBC, wherein a first input end of the fifth PBC is connected to the second output end of the fifth PMOC, wherein the first input end of the fifth PBC is configured to receive the eighth coupled signal, wherein a second input end of the fifth PBC is connected to the first output end of the seventh PMOC, wherein the second input end of the fifth PBC is configured to receive the fourteenth coupled signal, wherein an output end of the fifth PBC is connected to an input end of a fifth PD, wherein the output end of the fifth PBC is configured to output a fifth combined signal to the fifth PD, and wherein the fifth combined signal is a sum of the eighth coupled signal and the fourteenth coupled signal;
a sixth PBC, wherein a first input end of the sixth PBC is connected to the output end of the third attenuator, wherein the first input end of the sixth PBC is configured to receive the ninth coupled signal, wherein a second input end of the sixth PBC is connected to the second output end of the seventh PMOC, wherein the sixth PBC is configured to receive the fifteenth coupled signal, wherein an output end of the sixth PBC is connected to an input end of a sixth PD, wherein the output end of the sixth PBC is configured to output a sixth combined signal to the sixth PD, and wherein the sixth combined signal is a sum of the ninth coupled signal and the fifteenth coupled signal;

a seventh PBC, wherein a first input end of the seventh PBC is connected to the first output end of the sixth PMOC, wherein the first input end of the seventh PBC is configured to receive the tenth coupled signal, wherein a second input end of the seventh PBC is connected to the output end of the fourth attenuator, wherein the second input end of the seventh PBC is configured to receive the sixteenth coupled signal, wherein an output end of the seventh PBC is connected to an input end of a seventh PD, wherein the output end of the seventh PBC is configured to output a seventh combined signal to the seventh PD, and wherein the seventh combined signal is a sum of the tenth coupled signal and the sixteenth coupled signal;

an eighth PBC, wherein a first input end of the eighth PBC is connected to the second output end of the sixth PMOC, wherein the first input end of the eighth PBC is configured to receive the eleventh coupled signal, wherein a second input end of the eighth PBC is connected to the first output end of the eighth PMOC, wherein the second input end of the eight PBC is configured to receive the seventeenth coupled signal, wherein an output end of the eighth PBC is connected to an input end of an eighth PD, wherein the output end of the eighth PBC is configured to output an eighth combined signal to the eighth PD, and wherein the eighth combined signal is a sum of the eleventh coupled signal and the seventeenth coupled signal;

a ninth PBC, wherein a first input end of the ninth PBC is connected to the output end of the fourth attenuator, wherein the first input end of the ninth PBC is configured to receive the twelfth coupled signal, wherein a second input end of the ninth PBC is connected to the second output end of the eighth PMOC, wherein the second input end of the ninth PBC is configured to receive the eighteenth coupled signal, wherein an output end of the ninth PBC is connected to an input end of a ninth PD, wherein the output end of the ninth PBC is configured to output a ninth combined signal to the ninth PD, and wherein the ninth combined signal is a sum of the twelfth coupled signal and the eighteenth coupled signal;

the fourth PD, wherein an output end of the fourth PD is configured to output an electrical signal of the fourth combined signal;

the fifth PD, wherein an output end of the fifth PD is configured to output an electrical signal of the fifth combined signal;

the sixth PD, wherein an output end of the sixth PD is configured to output an electrical signal of the sixth combined signal;

the seventh PD, wherein an output end of the seventh PD is configured to output an electrical signal of the seventh combined signal;

the eighth PD, wherein an output end of the eighth PD is configured to output an electrical signal of the eighth combined signal; and the ninth PD, wherein an output end of the ninth PD is configured to output an electrical signal of the ninth combined signal.

10. The receiver according to claim 9, wherein the digital-signal acquisition unit comprises:
a third converter, configured to convert received electrical signals of combined signals to digital signals of the combined signals;
a second processor connected to an output end of a third converter; and
a non-transitory computer readable storage medium storing a program for execution by the second processor, the program including instructions to:
subtract of the fifth combined signal from a first digital signal of the digital signals, to obtain a digital signal of a quadrature component electrical signal of the dual-polarization signal in the Y polarization direction;
subtract the sixth combined signal from a second digital signal of the digital signals, to obtain a digital signal of a quadrature component electrical signal of the dual-polarization signal in the X polarization direction;
subtract the eighth combined signal from a third digital signal of the digital signals, to obtain a digital signal of an in-phase component electrical signal of the dual-polarization signal in the Y polarization direction; and
subtract the ninth combined signal from a fourth digital signal of the digital signals, to obtain a digital signal of an in-phase component electrical signal of the dual-polarization signal in the X polarization direction.

11. The receiver according to claim 9, wherein the signal combination unit is further configured to:
subtract the electrical signal of the fifth combined signal from the electrical signal of the fourth combined signal, to obtain a quadrature component electrical signal of the dual-polarization signal in the Y polarization direction;
subtract the electrical signal of the sixth combined signal from the electrical signal of the fifth combined signal, to obtain a quadrature component electrical signal of the dual-polarization signal in the X polarization direction;
subtract the electrical signal of the eighth combined signal from the electrical signal of the seventh combined signal, to obtain an in-phase component electrical signal of the dual-polarization signal in the Y polarization direction; and
subtract the electrical signal of the ninth combined signal from the electrical signal of the eighth combined signal, to obtain an in-phase component electrical signal of the dual-polarization signal in the X polarization direction; and
wherein the digital-signal acquisition unit comprises a fourth converter, configured to:
convert the in-phase component electrical signal of the dual-polarization signal in the Y polarization direction;
convert the in-phase component electrical signal of the dual-polarization signal in the X polarization direction;

convert the quadrature component electrical signal of the dual-polarization signal in the Y polarization direction; and convert the quadrature component electrical signal of the dual-polarization signal in the X polarization direction to digital signals respectively.

12. The receiver according to claim 11, wherein the signal combination unit further comprises:

a third subtractor, wherein a positive input end of the third subtractor is connected to the output end of the fourth PD, wherein the positive input end of the third subtractor is configured to input the electrical signal of the fourth combined signal, wherein a negative input end of the third subtractor is connected to the output end of the fifth PD and inputs the electrical signal of the fifth combined signal, and wherein an output end of the third subtractor is configured to output the quadrature component electrical signal of the dual-polarization signal in the Y polarization direction;

a fourth subtractor, wherein a positive input end of the fourth subtractor is connected to the output end of the fifth PD, wherein the positive input end of the fourth subtractor is configured to input the electrical signal of the fifth combined signal, wherein a negative input end of the fourth subtractor is connected to the output end of the sixth PD, wherein the negative input end of the fourth subtractor is configured to input the electrical signal of the sixth combined signal, and wherein an output end of the fourth subtractor is configured to output the quadrature component electrical signal of the dual-polarization signal in the X polarization direction;

a fifth subtractor, wherein a positive input end of the fifth subtractor is connected to the output end of the seventh PD, wherein the positive input end of the fifth subtractor is configured to input the electrical signal of the seventh combined signal, wherein a negative input end of the fifth subtractor is connected to the output end of the eighth PD, wherein the negative input end of the fifth subtractor is configured to input the electrical signal of the eighth combined signal, and wherein an output end of the fifth subtractor is configured to output the in-phase component electrical signal of the dual-polarization signal in the Y polarization direction; and a sixth subtractor, wherein a positive input end of the sixth subtractor is connected to the output end of the eighth PD, wherein the positive input end of the sixth subtractor is configured to input the electrical signal of the eighth combined signal, wherein a negative input end of the sixth subtractor is connected to the output end of the ninth PD, wherein the negative input end of the sixth subtractor is configured to input the electrical signal of the ninth combined signal, and wherein an output end of the sixth subtractor is configured to output the in-phase component electrical signal of the dual-polarization signal in the X polarization direction.

13. The receiver according to claim 1, further comprising:
a third processor; and
a non-transitory computer readable storage medium storing a program for execution by the third processor, the program including instructions to:
receive the digital signal of the electrical signal of the dual-polarization signal in the X polarization direction;
receive the digital signal of the electrical signal of the dual-polarization signal in the Y polarization direction; and process the digital signal of the electrical signal in the X polarization direction and the digital signal of the electrical signal in the Y polarization direction according to:

$$\hat{H} = \begin{bmatrix} \cos(a) & -\sin(a) \\ \sin(a) & \cos(a) \end{bmatrix}^{-1},$$

to obtain a result of demodulation of the dual-polarization signal, wherein a is an angular difference existing between signal polarization coordinates and PBS coordinates.

14. A receiver, comprising:
an optical signal acquisition unit, configured to:
receive a dual-polarization signal; and
perform polarization beam splitting processing on the dual-polarization signal, to obtain an X polarization direction signal and a Y polarization direction signal;
a signal conversion unit, connected to the optical signal acquisition unit, wherein the signal conversion unit is configured to:
convert the X polarization direction signal to an X polarized electrical signal; and
convert the Y polarization direction signal to an Y polarized electrical signal; and
a digital-signal conversion unit, connected to the signal conversion unit, wherein the digital-signal conversion unit is configured to convert the X polarized electrical signal and the Y polarized electrical signal to an X polarized digital signal and to a Y polarized digital signal, respectively; and
wherein data in every three frames of the dual-polarization signal is a unit, wherein structures of the data in three frames successively comprise: $\vec{E}_{Sx}$ and $\vec{E}_{Sy}$, $\vec{E}_{Sx}$ and $-\vec{E}_{Sy}$, and $-\vec{E}_{Sx}$ and $-\vec{E}_{Sy}$, wherein $\vec{E}_{Sx}$ is the X polarization direction signal, and wherein $\vec{E}_{Sx}$ is the Y polarization direction signal.

15. The receiver according to claim 14, wherein the optical signal acquisition unit comprises:
a polarization beam splitter (PBS), wherein an input end of the PBS is configured to receive the dual-polarization signal, wherein a first output end of the PBS is configured to output the X polarization direction signal, and wherein a second output end of the PBS is configured to output of the Y polarization direction signal.

16. The receiver according to claim 15, wherein the signal conversion unit comprises:
a first photoelectric detector (PD), wherein an input end of the first PD is connected to the first output end of the PBS, wherein the input end of the first PD is configured to receive the X polarization direction signal, and wherein an output end of the first PD is configured to output the X polarized electrical signal; and
a second PD, wherein an input end of the second PD is connected to the second output end of the PBS, wherein the input end of the second PD is configured to receive the Y polarization direction signal, and wherein an output end of the second PD is configured to output Y polarized electrical signal.

17. The receiver according to claim 16, wherein the digital-signal conversion unit comprises:
a first analog-to-digital converter (ADC), wherein an input end of the first ADC is connected to the output end of the first PD, wherein the first ADC is configured to convert the X polarized electrical signal to a digital signal; and a second ADC, wherein an input end of the second ADC is connected to the output end of the second PD, wherein the second ADC is configured to convert the Y polarized electrical signal to a digital signal.

18. A method comprising:

receiving a dual-polarization signal;

receiving a local oscillation;

performing polarization beam splitting processing on the dual-polarization signal to obtain signals of the dual-polarization signal in an X polarization direction and a Y polarization direction;

performing polarization beam splitting processing on the local oscillation, separately, to obtain signals of the local oscillation in an X polarization direction and a Y polarization direction;

performing coupling processing on the signal of the dual-polarization signal in the X polarization direction;

performing coupling processing on the signal of the local oscillation in the X polarization direction;

obtaining X polarized coupled signals with different phase shifts in the X polarization direction in accordance with the coupling processed dual-polarization signal in the X polarization direction and the coupling processed local oscillation in the X polarization direction;

performing coupling processing on the signal of the dual-polarization signal in the Y polarization direction;

performing coupling processing on the signal of the local oscillation in the Y polarization direction;

obtaining Y polarized coupled signals with different phase shifts in the Y polarization direction in accordance with the coupling processed dual-polarization signal in the Y polarization direction and the coupling processed local oscillation in the Y polarization direction;

performing signal combination on a group of one coupled signal in the X polarization direction and one coupled signal in the Y polarization direction, to obtain a combined signal;

converting the combined signal to an electrical signal;

receiving electrical signals; and generating a digital signal of an electrical signal of the dual-polarization signal in the X polarization direction and a digital signal of an electrical signal of the dual-polarization signal in the Y polarization direction according to the electrical signals.

* * * * *